(12) United States Patent
Salajegheh et al.

(10) Patent No.: US 11,895,113 B2
(45) Date of Patent: Feb. 6, 2024

(54) COLLABORATIVE RISK AWARE AUTHENTICATION

(71) Applicant: Visa International Service Association, San Francisco, CA (US)

(72) Inventors: Mastooreh Salajegheh, San Jose, CA (US); Shashank Agrawal, Sunnyvale, CA (US); Eric Le Saint, Los Altos, CA (US); Payman Mohassel, San Jose, CA (US); Mihai Christodorescu, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 311 days.

(21) Appl. No.: 17/291,090

(22) PCT Filed: Aug. 30, 2019

(86) PCT No.: PCT/US2019/048991
§ 371 (c)(1),
(2) Date: May 4, 2021

(87) PCT Pub. No.: WO2020/101787
PCT Pub. Date: May 22, 2020

(65) Prior Publication Data
US 2021/0409405 A1 Dec. 30, 2021

Related U.S. Application Data

(60) Provisional application No. 62/768,002, filed on Nov. 15, 2018.

(51) Int. Cl.
*H04L 9/40* (2022.01)
*H04L 9/08* (2006.01)

(52) U.S. Cl.
CPC .......... *H04L 63/0884* (2013.01); *H04L 9/085* (2013.01)

(58) Field of Classification Search
CPC ............. G06F 21/44; G06F 2221/2103; G06F 2221/2111; H04L 2463/082;
(Continued)

(56) References Cited

U.S. PATENT DOCUMENTS

2009/0265775 A1* 10/2009 Wisely ................ H04L 63/0492
380/270
2012/0144468 A1* 6/2012 Pratt ..................... H04L 9/3271
726/7
(Continued)

FOREIGN PATENT DOCUMENTS

CN 105071938 A 11/2015
CN 106416336 A 2/2017
(Continued)

OTHER PUBLICATIONS

Application No. EP19885336.8, Extended European Search Report, dated Dec. 14, 2021, 12 pages.
(Continued)

*Primary Examiner* — Theodore C Parsons
(74) *Attorney, Agent, or Firm* — Kilpatrick Townsend & Stockton LLP

(57) ABSTRACT

An initiator device can broadcast a witness request to one or more authentication devices. The one or more authentication devices can then determine an assurance level from a range of assurance levels and determine a token share corresponding to the assurance level. The initiator device can then receive, from the one or more authentication devices, at least one witness response comprising the token share corresponding to the assurance level. The initiator device can generate an authentication token using a set of token shares.

(Continued)

The initiator device can then transmit the authentication token to an authentication server, wherein the authentication server verifies the authentication token.

20 Claims, 18 Drawing Sheets

(58) Field of Classification Search
CPC ............ H04L 63/0807; H04L 63/0884; H04L 63/105; H04L 63/107; H04L 9/085; H04W 12/06
See application file for complete search history.

(56) References Cited

U.S. PATENT DOCUMENTS

| | | | |
|---|---|---|---|
| 2014/0341374 A1 | 11/2014 | Thozhuvanoor | |
| 2015/0288674 A1 | 10/2015 | Lautenschlager | |
| 2016/0180084 A1* | 6/2016 | Spurlock | H04L 63/1441 726/22 |
| 2017/0149828 A1* | 5/2017 | Botti | H04L 63/20 |
| 2018/0069867 A1* | 3/2018 | Grajek | H04W 12/068 |
| 2018/0069936 A1* | 3/2018 | Kumnick | G06Q 20/4016 |
| 2018/0183802 A1 | 6/2018 | Choyi et al. | |
| 2018/0255461 A1 | 9/2018 | Bhogal et al. | |
| 2018/0317085 A1* | 11/2018 | Gujjar | H04L 63/107 |
| 2019/0044949 A1* | 2/2019 | Bartfai-Walcott | H04W 12/63 |
| 2019/0280863 A1* | 9/2019 | Meyer | G06F 7/08 |

FOREIGN PATENT DOCUMENTS

| | | | |
|---|---|---|---|
| CN | 107005413 A | 8/2017 | |
| KR | 101281217 | 7/2013 | |
| WO | WO-2006121854 A2 * | 11/2006 | ............ G06F 21/33 |
| WO | 2013080224 A2 | 6/2013 | |
| WO | 2014011997 | 1/2014 | |

OTHER PUBLICATIONS

Application No. SG11202104780X , Written Opinion, dated Jan. 4, 2023, 9 pages.
Application No. PCT/US2019/048991 , International Search Report and Written Opinion, dated Dec. 19, 2019, 12 pages.
Application No. CN201980073561.5 , Office Action, dated Sep. 29, 2022, 16 pages with English translation.
Application No. KR10-2021-7013746 , Office Action, dated Aug. 31, 2023, 5 pages.
Application No. EP19885336.8 , Office Action, dated Oct. 11, 2023, 8 pages.

* cited by examiner

| Scheme | Usability | | | | | | | | Deployability | | | | | |
|---|---|---|---|---|---|---|---|---|---|---|---|---|---|---|
| | Memorywise-Effortless | Scalable-for-Users | Nothing-to-Carry | Physically-Effortless | Easy-to-Learn | Efficient-to-Use | Infrequent-Errors | Easy-Recovery-from-Loss | Accessible | Negligible-Cost-per-User | Server-Compatible | Browser-Compatible | Mature | Non-Proprietary |
| Embodiments | | | S | | Y | Y | S | S | Y | Y | | Y | | |
| Listening Watch | | | S | | Y | Y | S | S | Y | Y | | Y | | |
| Sound-Proof | | | S | | Y | Y | S | S | Y | Y | | Y | | Y |
| PhoneAuth | | | S | | Y | Y | S | S | Y | Y | | | | Y |
| Google 2SV | | | S | | Y | S | S | S | S | S | | Y | Y | Y |
| Passwords | | | Y | | Y | Y | S | Y | Y | Y | Y | Y | Y | Y |

*FIG. 12*

| Scheme | Resilient-to-Physical-Observation | Resilient-to-Targeted-Impersonation | Resilient-to-Throttled-Guessing | Resilient-to-Unthrottled-Guessing | Resilient-to-Internal-Observation | Resilient-to-Leaks-from-Other-Verifiers | Resilient-to-Phishing | Resilient-to-Theft | No-Trusted-Third-Party | Requiring-Explicit-Consent | Unlinkable | Resilient-to-context-manipulation |
|---|---|---|---|---|---|---|---|---|---|---|---|---|
| Embodiments | Y | S | Y | Y | Y | Y | Y | Y | Y | Y | Y | Y |
| Listening Watch | Y | S | Y | Y | Y | Y | Y | Y | Y | Y | Y | Y |
| Sound-Proof | S | S | Y | Y | | Y | Y | Y | Y | Y | | |
| PhoneAuth | S | S | Y | Y | | Y | Y | Y | Y | Y | S | S |
| Google 2SV | S | S | Y | Y | Y | Y | Y | Y | Y | Y | Y | Y |
| Passwords | Y | S | | | | | | Y | Y | Y | Y | Y |

*FIG. 13*

ABORATIVE RISK AWARE
COLLABORATIVE RISK AWARE AUTHENTICATION

CLAIM OF PRIORITY

This application is a 371 application of international patent application number PCT/US2019/048991, filed Aug. 30, 2019, which claims the benefit of the filing date of U.S. Patent Application No. 62/768,002, filed Nov. 15, 2018, which is herein incorporated by reference in its entirety for all purposes.

BACKGROUND

Multi-factor authentication (MFA) is a way to increase the security of authentication by using multiple pieces of evidence to establish a user's identity, typically categorized as "something you know, something you have, and something you are." There are many MFA schemes, with 2-factor authentication (2FA) schemes being the most popular, in which not only does the user need to be in possession of a correct password, the user needs to confirm the possession of a challenge code sent from an authentication server via some pre-established channel (e.g., short message service (SMS), smartphone push notification, email) or generated via a pre-established mechanism (e.g., hardware token, app).

Unfortunately, scaling MFA from two to three or more factors impacts usability, even when it improves security, as handling more factors currently requires more user interaction. This tradeoff between security and usability is an unfortunate property of today's authentication approaches.

Embodiments of the disclosure address this and other problems, individually and collectively.

BRIEF SUMMARY

Embodiments of the present disclosure provide methods, apparatuses, and systems for implementing collaborative risk aware authentication.

In some embodiments of the disclosure, an initiator device can broadcast a witness request to one or more authentication devices. The one or more authentication devices can then determine an assurance level from a range of assurance levels and determine a token share corresponding to the assurance level. The initiator device can then receive, from the one or more authentication devices, at least one witness response comprising the token share corresponding to the assurance level. The initiator device can generate an authentication token using a set of token shares. The initiator device can then transmit the authentication token to an authentication server, wherein the authentication server verifies the authentication token.

In other embodiments of the disclosure, an authentication device can receive a witness request from an initiator device. The authentication device can then determine a first assurance level associated with the initiator device based on a trust score. The first assurance level can be determined from a range of assurance levels. The authentication device can then obtain a token share corresponding to the first assurance level and then transmit the token share for the first assurance level to the initiator device.

These and other embodiments are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 12 shows a table comparing usability and deployability between embodiments of the disclosure other MFA and 2FA schemes.

FIG. 13 shows a table comparing security between embodiments of the disclosure other MFA and 2FA schemes.

TERMS

Figure 1:
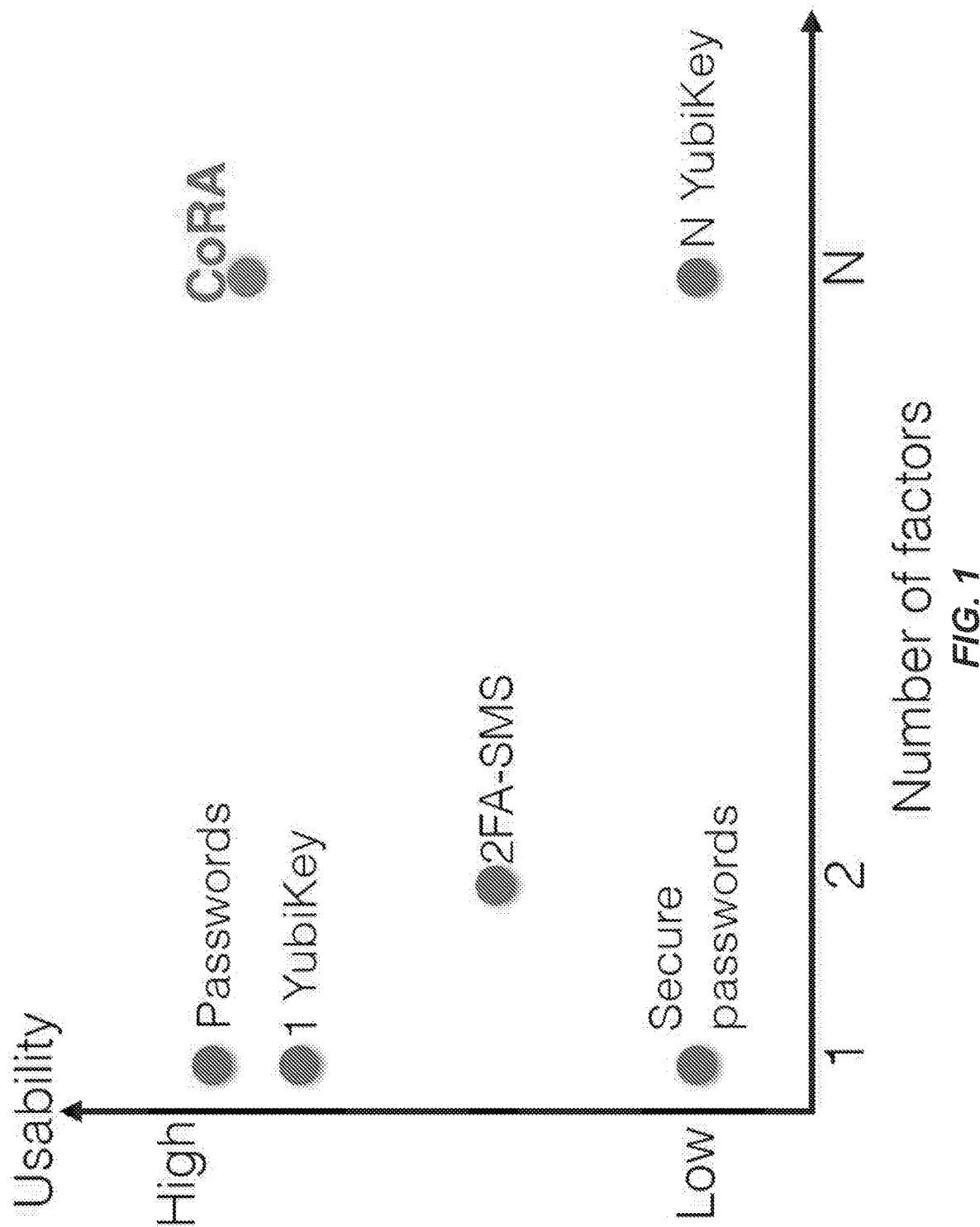
FIG. 1 shows a comparison of embodiments of the disclosure against other MFA and 2FA schemes.

Prior to discussing embodiments of the disclosure, description of some terms may be helpful in understanding embodiments of the disclosure.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers, which may be coupled to one or more databases.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" can include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" (or just "key") can include something used in encryption or decryption. A cryptographic key could, for example, refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" can include text that is in a plain form. For example, this may refer to text that is readable by a human or a computer without any processing, such as the phrase "hello, how are you?" It may also refer to text that is in an unencrypted form. Numbers or other symbols may also qualify as plaintext.

The term "ciphertext" can include text that is in an encrypted form. For example, this could refer to text that must be decrypted before it is readable by a human or computer. Ciphertext may be generated by any number of cryptographic algorithms or cryptosystems, such as RSA or AES.

A "user device" may be a device that is operated by a user. Examples of user devices may include a mobile phone, a smart phone, a personal digital assistant (PDA), a laptop computer, a desktop computer, a server computer, a voice-controlled assistant, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

In some embodiments, a user device can perform various functions and can operate in different rolls in a process. For example, a user device can be an initiator device and an authentication device. As an example, a user may have four devices including a user device, an initiator device, and two authentication devices.

An "initiator device" can include a device that can initiate a process. In some embodiments, an initiator can include a device that initiates token generation by collaborating with other devices. An initiator device can be a user device.

An "authentication device" can include a device capable of authentication. In some embodiments, an authentication device can be a device that agrees to collaborate with an initiator device to compute an authentication token. An authentication device can be a user device.

A "whistle blower" can include an entity and/or device that informs on a malicious device. In some embodiments, a whistle blower can include a device that can directly observe malicious activity and can spread information regarding the malicious activity to other devices that may be blind to the malicious activity.

An "authentication server" can include a server capable of authentication. An authentication server can be operated by an authenticator which can include an entity capable of authentication. In some embodiments, the authenticator can include an entity that offers services and authenticates a user for the service by verifying a token.

A "trust score" can include a value of a level of trust. For example, a trust score can show a level of trust a device puts into its neighboring devices (i.e., devices in direct communication range). A trust score can be based on observed behavior of the other device and/or its perceived location. Each device can maintain a vector of trust scores for all of the device's neighbors. A trust score may not be representative of one specific interaction, but it can be an indication of how "normal" and "reliable" a device behaves and/or is configured.

The term "assurance level" can include a measure or indication of how much confidence an entity has regarding something. For example, an assurance level can be a value that is calculated for each authentication. An assurance level can depend on a trust level of an initiator device, a time and location of authentication, authentication history of the device, user preferences for the device, and/or location of the initiator device. In some embodiments, an assurance level can correspond to meeting certain authentication policy requirements.

"Device behavior" can include behavior of a device. In some embodiments, real-time device behavior can be observed by a second device and/or entity. Device behavior can include features such as number of packets, size of packets, source, destination, the decision to join or leave payment, proximity, etc.

"Authentication behavior" can include device behavior during authentication. In some embodiments, authentication behavior can include behavior during past authentications. Each device can store an authentication history including authentication behavior performed by its neighbors for a window of time. Authentication behavior can include features such as authentication time and authentication location. In general, many features can use a high amount of storage, however, in some embodiments, the device can store the timestamp of the witness request from each initiator to limit the amount of data stored in the authentication history.

"Threshold cryptography" can include cryptographic schemes that can be used in a threshold manner to reduce exposure to secret keys. Rather than storing secret keys on one device, the secret keys can be distributed among several devices such that at least a threshold number of secret keys is needed to perform cryptographic operations. For example, a decryption key for a public-key signature scheme could be protected by distributing it among 5 devices. If the threshold is set to 2, then at least 2 devices are needed to decrypt any ciphertext using the decryption key.

A "secret" may include a value or thing kept hidden as part of a cryptographic process. The security of the cryptographic process may rely on the secret only being known to only a few parties. For example, a secret may be a cryptographic key. Exposure of the secret may allow parties other than the intended parties to encrypt or decrypt messages.

A "shared secret" may include a secret value or thing shared between multiple parties. For example, a shared secret may be a cryptographic key, divided up such that multiple parties each possess a fraction of that cryptographic key. For instance, a 128 bit cryptographic key may be divided among 8 parties, such that each party holds 16 bits of the cryptographic key.

A "secret share" may include a value derived from a shared secret. As an example, a secret share may be the first 12 bits of a secret value. A secret share may also be a secret value binary exclusive-OR with a number. A secret share may in some instances be combined with a number of other secret shares in order to reproduce a secret. In some embodiments, a secret share can be a token share. An authentication token can be obtained using token share(s).

DETAILED DESCRIPTION

Current authentication techniques face a trade-off of security versus usability. Two factor authentication, for example, is one way to improve security at the cost of requiring user interaction for every round. Most 2FA methods are bound to a user's phone and fail if the phone is not available. Embodiments of the disclosure allow for a seamless and risk-aware authentication method that can take advantage of devices that the user owns.

Embodiments of the disclosure provide for increased security while preserving usability by using threshold message authentication codes (MACs). Embodiments can also tap into the knowledge of the user devices rather than requiring user knowledge and/or interaction. Using embodiments of the disclosure, authentication tokens can be generated collaboratively by multiple devices owned by the user. The authentication token can be accompanied by a risk factor that indicates the reliability of the authentication token to an authentication server. Embodiments can utilize 1) a trust-meter system for devices to determine the risk factor and 2) threshold cryptography to ensure no single point of failure. Some embodiments do not assume any secure element or physical security for the devices.

The following sections describe methods and systems used to perform collaborative risk-aware authentication in greater detail. Section I introduces embodiments in terms of current problems in authentication security. Section II provides an overview of a design according to embodiments of the disclosure including a threat model, advantages, and approach. Section III describes related work. Section IV discusses a system that performs collaborative risk-aware authentication. Section V describes a method of collaborative risk-aware authentication. Section VI provides a security analysis. Section VII provides an evaluation of embodiments of the disclosure. Section VIII describes example applications of collaborative risk-aware authentication according to embodiments of the disclosure. Section IX includes a conclusion. Section X describes a computer system according to some embodiments. Section XI provides references.

I. INTRODUCTION

The availability and adoption of Internet of things (IoT) means users own more than one device and often have multiple devices with them during daily activities. From a recent 2018 study [23] users (in the US) own an average of 4.4 devices, with a whole 35.9% having six or more devices (and this percentage is an increase from 23.4% in 2017). These devices range from smartphones, laptops, tablets, smart TVs, game consoles, voice-controlled assistants, connected cars, e-readers, activity/fitness trackers, smartwatches, to smart-home devices (refrigerators, thermostat, camera). Devices normally used every day have sufficient information about their user to collaboratively provide evidence to the user's (digital) identity. Moreover, multiple devices allow for redundancy by removing any single point of failure. Embodiments provide a new frictionless way to identify users with user devices. A visual comparison of embodiments, various embodiments collectively referred to as collaborative risk-aware authentication (CoRA), against other MFA and 2FA schemes is shown in FIG. 1.

FIG. 1 shows a comparison of embodiments of the disclosure against other MFA and 2FA schemes. Increasing the number of factors potentially improves security, however it may affect usability with today's techniques. For example, a password-only authentication system is the easiest to use, but is not secure. A secure password is difficult to remember and thus ranks low in terms of usability. Yubikey provides more usability however it has the disadvantage of a single point of failure. Embodiments of the disclosure bridge the gap between highly usable seamless authentication and highly secure MFA.

Seamless authentication addresses the usability challenge of MFA by having the various devices communicate with each other to exchange the needed information (the evidence of identity), after the successful establishment of proximity among the devices. Thus instead of the user transferring challenge codes from one device to another, devices in close proximity with each other automate the process. The existing seamless authentication schemes focus on two factors and provide 2FA security by pairing a main device (e.g., a laptop) with a mobile device (e.g., smartphone [6], smart watch [20]). The primary obstacles of adopting these seamless 2FA schemes are security and availability. If the pre-established channel to the mobile device or the mobile device itself are compromised, the security of the scheme degrades to that of password-only authentication. On the other hand if the mobile device is not present, out of power, or otherwise unavailable, the seamless 2FA scheme cannot proceed.

Embodiments of the disclosure can take advantage of the fact that users often have multiple devices (e.g., IoT devices) with them. Furthermore, IoT devices are networked and capable of connecting either directly, or via a hub, to the Internet. As a result, a user's collection of IoT devices can exchange information, measure context, and authenticate the user together, creating an ideal platform on which to deploy seamless MFA. To this end, embodiments of the disclosure allow for as many factors as available to participate in the authentication process and produce a highly assured identity.

Having many devices available to serve as seamless MFA authenticators brings at least three challenges. First, not all devices may be available at all times, therefore CoRA can allow for some factors to be absent and can reflect this absence in the produced identity. Second, it can be assumed that some devices will be compromised (physically or virtually) and thus, in some embodiments, devices may not store all secrets in any individual device. Third, some compromise is to be expected, thus embodiments can exclude such compromised devices from participating in the authentication process.

Yet another challenge is that of user privacy. While device churn and device compromise, as described above, impact the correctness and security of the authentication process, privacy in this context refers to the amount of information that the authentication server learns about the user during each instance of the authentication process. In some embodiments, the authentication server cannot learn any information beyond what is needed to establish a high-assurance identity. In particular, in the IoT context the user may wish to keep the set of devices used during an authentication private, for example, device location, device state, etc. Doing so adds complexity to the authentication scheme. Indeed, if one does not care about privacy, then a simple scheme where every device communicates cryptographic evidence (e.g., one MAC per device, based on a secret key shared with the server) for the authentication server to tally would suffice for an privacy-intrusive MFA scheme. This naïve scheme continuously provides information to the server about which devices are in use at what time by the user. Embodiments of the disclosure to eliminate this privacy concern.

Embodiments can address these challenges while protecting user privacy. Except for an assurance level that can accompany an authentication token, no other information about the devices or the user is sent to the authentication server. In some embodiments, devices can use proximity checking to identify peer devices that are present nearby, apply anomaly detection to determine which of these proximal peers are trustworthy, participate in a series of threshold MAC schemes with the trusted devices, and finally compute an authentication token that captures the number of devices participating (expressed as a cryptographic threshold), the trust shared among these devices (expressed as an assurance level), and information about the authentication request itself (user name for the account, level of authentication needed, etc.). Thus the privacy-preserving authentication scheme according to embodiments of the disclosure scales to any number of factors, provides risk information, and maintains the usability of seamless authentication.

Embodiments can provide for the following improvements, which will be discussed in further detail herein. A risk-aware threshold cryptographic scheme can allow a device to decide whether to participate in a distributed cryptographic protocol based on the trust it has in other devices, as described in section IV.B. In section IV, it is shown how to build a multi-level risk-aware authentication method on top of the risk-aware threshold cryptographic scheme. In sections VI and VII, an evaluation of how "web-of-trusted-devices" approach to authentication performs in the presence of a variety of physical and virtual attackers is performed.

Additionally, related work is discussed in section III. Example applications of embodiments of the disclosure are discussed in section VIII.

II. DESIGN

The system according to embodiments of the disclosure can allow for a user to authenticate to a remote server (e.g., an authentication server) via any of their user devices, with the help of other user devices owned and/or operated by the same user. The use of several user devices owned by the same user, that all contribute to the authentication task, increases security and usability at the same time. In this section, the threat model, goals, and approach of the CoRA multi-device authentication scheme will be explained.

For the purposes of CoRA, a user can own some number, N, of user devices of varying capabilities with respect to computation, security, sensing, and biometric input. A number, $K \in [1, N]$, of user devices can be available to the user at any given time for performing authentication tasks. For example, a user may own five devices, a laptop, a smart watch, a smart phone, a smart car, and a smart refrigerator, but only have two of them on hand while traveling (e.g., the watch and the phone).

A. Threat Model

It can be assumed that an attacker can gain control of a user's devices, either by stealing them and getting physical control or by compromising them by exploiting vulnerabilities in the software or hardware of the device. When an attacker controls a user device, it can be assumed they have full access to data and code on the user device. In other words, they can make the user device(s) in their control refuse to participate in an authentication task, or participate with incorrect data, or trigger fake authentication requests, and so on. For simplicity, attacker-controlled devices will be referred to as malicious whereas non-malicious devices will be referred to as honest.

An attacker can be successful if they can authenticate as the victim user to a remote server, without the user initiating an authentication task. However, authentication under duress and social-engineering attacks will not be discussed herein.

It can be assumed that the user's password is compromised (as is usual for any MFA scheme) and focus on the goal of securing the multiple, secondary factors that can be used for authentication in addition to the password. The attacker has knowledge of the password and is either a remote attacker controlling a compromised subset of the user's devices or a local attacker controlling the communication channels between the user devices. It can be assumed that the attacker does not control all of the user's devices, otherwise because the attacker knows the password and controls all of the devices, they are indistinguishable from the user.

B. Advantages

Embodiments of the disclosure provide for several advantages. For example, embodiments provide for increased security, improved usability, resilience to device compromise, and increased privacy. These advantages are described in further detail herein.

1. Increased Security

Increased security means that the bar for an attacker to succeed is higher, and according to embodiments, it means that an attacker needs to control many of a user's devices to successfully authenticate as that user to an authentication server. The implication is that as the number of user devices owned by a user increases, the security guarantee of CoRA authentication can be stronger. Note that strictly increasing the number of devices available for authentication does not strengthen security, but rather reduces it since the attack surface is increased (i.e., the attacker has more user devices to choose from when they decide to compromise the secondary factors). In other words, an increased number of devices available for authentication can be coupled with an increase in the number of devices required for authentication. This property is shown with the following equation, where k is a fixed threshold, p is a fixed probability of compromise, and n is a number of user devices. For a binomial distribution, security decreases for a fixed threshold k, a fixed probability of compromise p (for one device), and an increasing number of devices n (assuming device compromise is iid (independently and identically distributed)).

$$F(k; n, p) \le \exp\left(-2\frac{(np-k)^2}{n}\right)$$

2. Improved Usability

Improved usability means that the user has to memorize fewer secrets than existing schemes and the interactions required for authentication are limited to initiating the authentication task. At a minimum this excludes any approaches in the style of interactive 2FA schemes, where the user has to manually enter a code received on a separate user device (the 2FA channel).

3. Resilience to Device Compromise

In addition to security and usability, in some embodiments the authentication scheme can account for the fact that the user device(s) used for authentication might be malicious. The authentication server can receive risk information in addition to the authentication proof. This is in contrast with most of the existing authentication schemes, which provide a binary result (either the user is fully authenticated or they are not).

4. Privacy

A typical approach to derisking the authentication task is to collect as much data about the user, the user's device(s), and their environment, ship this data to the authentication server, and use some form of anomaly detection to trigger a secondary step-up authentication find a citation, in which the user has to do additional to prove their identity. In addition to reduced usability, step-up authentication based on contextual data violates a privacy goal for embodiments of the disclosure. One goal is to minimize the amount of information sent to the authentication server, to preserve user privacy.

The privacy goal can be defined with respect to each authentication operation. The authentication server can learn the number of user devices that participated in the operation and their associated risk assessment, but not which user devices participated nor anything about their context (e.g., location, etc.). An important distinction is that the privacy goal applies for the authentication operation, but not to the operations for adding and removing user devices from the system. It can be assumed that the user is fine with exposing the list of all user devices they own to the authentication server, such that the authentication server can identify any user device that contacts it as belonging to a given user.

C. Approach

In embodiments of the disclosure, an authentication server can maintain a list of user devices known to belong to the user—this can be referred to as the set of registered user devices. Each user device can be registered with the authentication server and can share a cryptographic secret with the authentication server. Additionally, each user device can receive cryptographic key shares for one or more instances of a threshold cryptographic scheme. When a user device is removed (e.g., either due to end of life or due to theft), the authentication server and the remaining user devices can generate and share a new cryptographic key.

User devices can maintain trust scores for every peer user device in the registered set; the trust score can be computed using anomaly detection over the history of interactions between pairs of user devices. User devices can thus mutually verify that they belong to the same user, can participate in a threshold cryptographic scheme to compute ciphertexts jointly, and can decide, on their own, which of their registered peer user devices can be trusted at any given moment.

When the user attempts to authenticate to the authentication server, for example, by entering their password in a web browser, the web browser can connect to one of registered user devices via a local communication scheme (e.g., over WebAuthn [24]). This user device, referred to as the initiator device for the duration of an authentication operation, can discover all other registered user devices in close proximity. The locally available user devices together with the initiator device can form the set of present user devices.

At this point, the initiator device can launch a request to all of the present user devices for the joint computation of an authentication token. Each user device receiving the request can determine whether to participate in this joint computation depending on their own trust score for the initiator device and their own trust scores for the other present user devices. For example, if there are a total of five user devices present (including the initiator device), but the initiator device is trusted by two other user devices, then three user devices can jointly compute an authentication token. The authentication token can reflect the number of user devices that participated in its computation.

Once the initiator device and the participating user devices compute the authentication token, the initiator device can provide the authentication token to the web browser, which can send the authentication token to the authentication server. Now, the authentication server has several pieces of evidence for the user's identity: the password entered in the browser, the device identity of the initiator device, and the authentication token defining the number of participating user devices. These items are then used to make an authentication decision, such as process a request, proceed with a payment transaction, allow access to a secure system and/or location, etc.

III. RELATED WORK

Next, various related work will be discussed, as well as the disadvantages of each. Zero-interaction authentication (ZIA), first introduced by Corner et al. [5] aimed to improve security of authentication in a seamless way by asking the user to wear an additional device that communicates with the laptop over a short-range to prove proximity. With the emergence of smart phones, a rich body of work focused on distant-bounding techniques for ZIA by using the available resources and sensors on smart phones. A summary of distance bounding works will be described in this section.

Halevi et al. [9] propose a secure proximity detection scheme based on ambient sensors such as audio and light data. PhoneAuth [6] uses Bluetooth communication between the phone and the laptop to prove proximity for 2FA. Drones to the rescue [17] offers a purely ambient physical sensing approach to ensure proximity of prover and verifier to prevent replay attacks. Marforio et al. [12] propose a location-based verification approach that relies on the trusted environment available in some phones. Sound-Proof [11] proves the proximity of user's device by recording audio on the phone and the laptop at the same time, and comparing the two on the phone. While Sounds-Proof is seamless, browser-compatible, and effective, it remains secure only if the phone is not compromised [19]. Listening watch [20] proposes separating the recording role and the comparison role in two devices, and also makes the audio more specific to a code sent by the server. While this work defends against near-far attacks, it is still vulnerable to compromising the phone or the communication link between the phone and the web-server. Since the phone's accept or reject message is not bound to the response of the watch, a compromised phone could simply verify being co-located with the laptop (browser).

While the above seamless 2FA contributions improve usability, they are all dependent on one source of information and on one device, which could be replaced by a distributed system (e.g., CoRA) to improve security and reliability. In particular, CoRA makes it cryptographically impossible for the initiator device to compute a token better than level one if other user devices refuse to participate in the authentication. Moreover, prior work either explicitly or implicitly assumes that all phones have a secure environment which is not always the case. By secret sharing the secret, CoRA allows for flexibility of choosing any of nearby user devices with enough computational power to initiate 2FA even when the user device does not have a secure element, which can be the case for most IoT devices.

The frictionless authentication system of [13] also proposes the use of multiple devices and threshold RSA signatures to authenticate users. Embodiments of the disclosure improve and enhance beyond their approach in several example ways: (i) embodiments enable the use of threshold MACs (using AES) which results in more efficient and widely available implementations; (ii) embodiments introduce multiple assurance levels each of which is tied to a different secret-shared key; and (iii) embodiments provide mechanisms for adding new user devices and levels to the system which requires careful adjustment of key generation and sharing for each cryptographic instantiation.

The work of Truong et al. [22; 21] investigates different channels for secure verification of proximity and concludes that fusing multiple sources would improve security if the attacker cannot compromise multiple channels at the same time. Embodiments can defend against such an adversary by using multiple user devices that are diverse in their hardware and software and more difficult to compromise all at the same time.

IV. SYSTEM ARCHITECTURE

Example details the architecture and main components of embodiments are now presented. First, definitions for two types of cryptographic schemes will be discussed. Then, the system as well as the high-level architecture of embodiments of the disclosure will be described. A description of initiator devices and authentication devices follows. Finally, classes of devices will be discussed.

A. Definitions

Two types of cryptographic schemes will be discussed: message authentication codes (MACs) and digital signatures. Both are used to confirm that a message came from the stated sender. MACs can be viewed as the symmetric-key (same key or one key) analogue of digital signatures. In a MAC scheme, a secret key can be used to authenticate messages. The same secret key is also needed to verify authenticated messages. On the other hand, there are two keys in a digital signature scheme: a signing key and a verification key. As the names imply, the signing key is used to sign messages, whereas the verification key is used to check if a signature is valid. A secure MAC scheme can guarantee that only with knowledge of the secret key, a message can be authenticated. Digital signatures can provide an analogous guarantee: only with knowledge of the signing key, a message can be signed.

Both MACs and digital signatures have been studied in a threshold setting. Naor et al. [14] introduced the notion of distributed pseudo-random functions (PRFs) in 1999. A PRF is a kind of MAC where authenticated messages look like random strings. They constructed distributed PRFs in two different ways, first based on cyclic groups where decisional Diffie-Hellman (DDH) assumption is believed to hold and then based on any standard PRF. These constructions have very different properties and will be discussed in detail in Section IV.B. Digital signature schemes have been studied more intensely in the literature. Threshold versions of various standard signature schemes like digital signature scheme (DSS), RSA, Boneh-Lynn-Shacham (BLS), elliptic curve digital signature algorithm (ECDSA), etc. have been proposed. Threshold versions of RSA [16] and BLS [3] in more detail in Section IV.B.

Embodiments of the disclosure can use these two schemes because their signature generation process is non-interactive. Given a message, each user device can generate a partial signature on the message using its share of the signing key. These partial signatures can then be combined by any suitable device (e.g., an initiator device)—no further interaction with the user devices is needed and the user devices may not need to communicate with one another.

Algorithms in a non-interactive threshold authentication scheme will now be described. A common definition will be formulated for both threshold MACs and signatures by using a more general terminology. Specifically, the word token (i.e., authentication token) is used instead of authenticated message for MAC and instead of signature for threshold signatures. Secret key can refer to the signing key of a threshold signature scheme. Although the set-up algorithm, below, would produce a separate verification key, it is understood that for a MAC, it is same as the secret key.

A non-interactive scheme for threshold signature can consist of four algorithms: 1) Setup, 2) GenPartTok, 3) Combine, and 4) Verify. Setup can take a number of user devices n and threshold t as inputs and can output a verification key and a list of n shares of a secret key. GenPartTok can take a message and one of the secret key shares as inputs and can output a partial token. Combine can take at least t partial tokens as input and can combine them to produce a full token. Finally, Verify can take the verification key and a full token as inputs and can output 1 if the token is valid.

Next, levels in a threshold scheme will be discussed. If a threshold MAC scheme has a threshold of 3, then at least 3 user devices are needed to authenticate a message properly. This may be too restrictive in certain situations like the setting considered herein, where a user could have 1 or 2 user devices out of all of their user devices at certain times of the day. Therefore, to make a threshold scheme more flexible, the concept of levels can be defined. A system that uses threshold cryptography can have multiple levels, each level associated with a different threshold. A lower level corresponds to a lower threshold and can provide lower assurance (because a smaller number of user devices need to be present). Whereas, a higher level can involve more user devices and can provide a higher assurance.

From an implementation point of view, each level can be a separate instance of the threshold scheme (i.e., separate key shares, verification key, etc.) instantiated with the corresponding threshold. In some embodiments, a system designer can choose the number of levels and the values of the thresholds for each level based on a close study of the requirements. In other embodiments, an application using the system can decide how to interpret the different levels. For example, a payment application can allow a transfer of up to $5 if a MAC of level 1 is presented. As another example, a data transfer application can allow a transfer of data that is tagged with the assurance level of the MAC.

B. Threshold MAC for Authentication

Four different threshold authentication mechanisms will be discussed. 1) A threshold message authentication code (MAC) based on any pseudo-random function [14]. Embodiments of the disclosure can use AES. 2) A threshold MAC based on the hardness of DDH assumption in cyclic groups [14]. 3) A threshold version of RSA due to Shoup [16]. 4) A threshold version of BLS signatures, based on the hardness of Gap-Diffie-Hellman [3].

Embodiments of the disclosure can use AES-MAC, DDH-MAC, RSA-Sig and BLS-Sig, respectively, as a shorthand for them. Each of these schemes have their pros and cons, but as described herein, AES-MAC is the best fit for embodiments of the disclosure.

Token shares as well as authentication tokens can be utilized in the authentication mechanism. A token share can be a portion of an authentication token. A token share can be determined from a key share. Each user device can store a key share, which the user device can use to determine the token share. In some embodiments, each user device can store more than one key share. Each stored key share can correspond to an assurance level, thus the token shares derived from the key shares can also correspond to an assurance level. In some embodiments, the token share can be a portion of the authentication token, derived from data to be signed and a key share.

The first authentication mechanism can be AES-MAC. Naor et al. [14] proposed a simple threshold MAC construction based on any pseudo-random function (PRF). A PRF can be a keyed function whose outputs cannot be predicted without knowledge of the key. Let f be a PRF, n the total number of devices, and t the threshold. The set of n devices can be divided into subsets of size n−t+1 and a PRF key can be associated with each one of them. Let U denote the entire collection of $$\binom{n}{n-t+1}$$

keys. U may be the master secret. A device can be given keys for all the subsets to which it belongs, so every device can get $$\binom{n}{n-t}$$

keys. In other words, a key share of a device can be defined by a set of $$\binom{n-1}{n-t}$$

PRF keys.

A MAC on a message m can be defined to be the XOR of all $f_k(m)$ for k∈U. To compute the MAC, m can be sent to any t out of n devices. Let S denote the set of t devices. Each device in S can evaluate f on m with each PRF key it has and send all the evaluations back. Note that every subset of size n−t+1 can intersect with S, so for any k∈U, there can be at least one device in S that has k. Therefore, from the evaluations sent back, one can eliminate the duplicates and XOR the rest to get the MAC.

Now, consider any subset S' of t−1 devices. There can be at least one subset of size n−t+1 that does not intersect with S'. So there is at least one key in U, say k*, that none of the devices in S' know about. As a result, S' cannot predict the output of $f_{k^*}(m)$ and would thus fail to compute the MAC on m. The device can instantiate the PRF f in the above construction using AES. It can have a fixed block size of 128 bits, i.e., the inputs and outputs are 128 bits. The key size can be, for example, 128, 192, or 256 bits depending on the level of security desired.

The second authentication mechanism can be DDH-MAC. Naor et al. proposed another threshold MAC construction based on the hardness of the Decisional Diffie-Hellman (DDH) problem. Let p be a large prime and $\mathbb{Z}_p$ be the set of non-negative integers less than p. Let G be a group of order p in which DDH is widely believed to be hard, such as elliptic-curve groups over finite fields. A random number s from $\mathbb{Z}_p$ can be chosen as the master secret and divided into n shares $s_1, \ldots, s_n$ using the Shamir secret sharing scheme [25], one share for each device. This sharing scheme has the property that if less than t shares are available, then s cannot be recovered. To compute a partial MAC on a message m, a device hashes m to get a group element h and raises h to $s_i$ (an exponentiation in G). The partial evaluations can be combined using Lagrange interpolation, which involves t exponentiations. The final MAC can be $h^s$.

The third authentication mechanism can be RSA-Sig. Shoup [16] gave the first non-interactive threshold RSA signatures. His scheme is set-up in the same way as regular RSA. The secret key is distributed among the devices in the same manner as the previous scheme, by using Shamir secret sharing. Computing a partial signature involves one modular exponentiation whereas combining partial values requires t+2 exponentiations.

The fourth authentication mechanism can be BLS-Sig. Boldyreva [3] proposed a simple way to make BLS signatures threshold. The construction is very similar to DDH-MAC above but the security now relies on the hardness of Gap Diffie-Hellman problem. For a master secret s, the verification key is $g^s$, where g is a generator of G. To verify a signature σ on m, one can check if (h, $g^s$, σ) is a valid DDH-tuple, i.e., whether σ=$h^s$ or not, where h is the hash of m.

These schemes are compared based on computational overhead (for generating a token share and for combining shares), storage and communication overhead (for key shares, for token shares, and for tokens), and security properties (ease of adding new devices, security against Authentication Server compromise). Each of these metrics depend on the security parameters of the schemes. For 128 bits of security, NIST [2] and ECRYPT-CSA [32] recommend key-size of 128 bits for AES, 3072 bits for RSA and 256 bits for ECC (elliptic-curve cryptography), which can be used for DDH-MAC and BLS-Sig. We will assume the maximum number of devices to be six because a large percentage of the population has six or fewer devices [23]. Both DDH-MAC and BLS-Sig can be instantiated in elliptic-curve groups of prime-order. Specifically, the curve secp256k1 [26] is used. Table 1 below provides a summary of the evaluation of the four schemes. In table 1, ayes value for Verifier compromise means that the scheme is insecure when the authentication server is compromised. Further, the comparison of threshold MACs and signatures computation times were measured on a MacBook Pro laptop with 2.9 GHz Intel Core i7 processor and 16 GB of memory.

TABLE 1

| Metrics | AES-MAC | DDH-MAC | RSA-Sig | BLS-Sig |
|---|---|---|---|---|
| Time (ms) | | | | |
| Generate share | 0.1 | 1.6 | 5.7 | 1.6 |
| Combine shares | 0* | 4.8 | 28.5 | 4.8 |
| Object size (bits) | | | | |
| One key share | 1280 | 256 | 3072 | 256 |
| One token share | 1280 | 256 | 3072 | 256 |
| One full token | 128 | 256 | 3072 | 256 |
| Properties | | | | |
| Adding devices | Easy | Easy | Difficult | Difficult |
| Verifier compromise | Yes | Yes | No | No |

(*The combine shares operation for AES-MAC involves only the elimination of duplicates and XOR'ing, so the time taken is negligible compared to the other authentication mechanisms.)

The four schemes can be evaluated on the following metrics for a fixed level. 1) Size of key share: this is the amount of secret data that needs to be stored persistently on each user device. 2) Size of token share: this is the amount of data that each user device will send to the initiator device. 3) Size of full token: this is the amount of data the initiator device will send to the verifier (i.e., authentication server). 4) Time to compute a partial token: this is the time spent by each user device to compute a token share. 5) Time to combine partial tokens. this is the time spent by the initiator device to combine the token shares and compute the full token (i.e., authentication token). 6) Adding a device: this metric explains how simple and scalable adding a new user device and giving it key shares is. 7) Security against verifier compromise.

Next, the seven metrics, above, will be discussed for the threshold authentication mechanisms.

Key share. The size of a key share for RSA can be 3072 bits and for DDH-MAC and BLS-Sig can be 256 bits. Key share size for AES-MAC can be $$\binom{n-1}{n-t}$$

times the size of an AES key, which can be at most 1280 bits. So, even in the worst case, AES-MAC is only a little bit more expensive than schemes based on ECC, and better than RSA-Sig.

Token share. The token share size can be similar to the key share size for all of the threshold authentication schemes (point compression can be used for ECC [27], AES block-size can be 128 bits).

Full token. While the full token size is similar to token share size for DDH-MAC, RSA-Sig and BLS-Sig, it is much smaller for AES-MAC—128 bits, because the final token is an XOR of AES outputs.

Generate token shares. Although AES could require up to $$\binom{n-1}{n-t}$$

AES evaluations, which could be at most 10, AES evaluation can be thousand times faster than exponentiation in RSA or ECC.

Generate share. Recall that in AES-MAC, a device evaluates the PRF on every PRF key it has. So it carries out $$l := \binom{n-1}{n-t}$$

AES evaluations. With n≤6, the maximum value of l can be 10 at t=3 or 4. On the other hand, all the other schemes require an exponentiation for token share generation. RSA-Sig needs an exponentiation in integer groups of composite order, and DDH-MAC and BLS-Sig need an exponentiation in elliptic-curve groups (under the instantiation described herein), which are over 100 times slower than an AES evaluation. Therefore, even if AES-MAC evaluates AES 10 times, generating token shares will still be much faster than other schemes.

Combine shares. Combining shares is straightforward for AES-MAC: eliminate duplicate shares and XOR the rest of the shares, whereas DDH-MAC, RSA-Sig, and BLS-Sig need exponentiations linear in the size of the threshold. For example, a device can remove duplicate token shares from a set of token shares and then XOR the remaining token shares from the set of token shares to determine the authentication token. Specifically, DDH-MAC and BLS-Sig need t exponentiations and RSA-Sig needs t+2. These three schemes also do other group operations but exponentiations dominate. Therefore, AES-MAC significantly outperforms other schemes in this aspect. t=3 is used to report the combination times in table 1 above. t=3 can be chosen because three is an intermediate threshold value; it is the worst case scenario for AES-MAC; and, other schemes will only perform worse at higher values of threshold.

Adding device. To add a new user device, a share of the master secret needs to be generated. For symmetric-key authentication (MACs), verifiers would have the master secret and can help with the addition of new user devices. On the other hand, for asymmetric authentication (signatures), the registered user devices themselves would help the new user device get a share of the master secret. This would require the use of more advanced tools like secure multi-party computation. At least t user devices would have to be online at the same time and communicate with each other over several rounds [30].

Verifier compromise. While symmetric authentication can make it easy to add new user devices, it may makes embodiments vulnerable to verifier compromise. For example, verifier compromise may occur if the authentication server becomes compromised by a malicious party.

C. Secret Shares

In some embodiments, the token share can be based on, or derived from a secret sharing system. The secret sharing system may be an m-out-of-n secret sharing system. In such a system, any collection of m secret shares (i.e., token shares), out of a total number of secret shares n can be sufficient to generate or recreate a shared secret (i.e., an authentication token). These secret shares may be derived from a shared secret (or "secret"), such as a key share, and may be kept hidden from other devices in the user device network.

One secret sharing method is Shamir's secret sharing. With Shamir's secret sharing, a shared secret is encoded as a coefficient in a polynomial P(x), usually the zeroth order coefficient, P(O). The degree of the polynomial (one less than the number of coefficients, or the greatest power term in the polynomial) is equal to the value m−1. The coefficients of the polynomial may be generated randomly or via another suitable method. Each of n support devices may be given one or more sampled values of the polynomial as its secret share. For example, in a group of 5 devices, the first device could be provided with P(1) and P(2), the second with P(3) and P(4), and so on until the 5th device is provided with P(9) and P(10). This may be accomplished using any appropriate secure provisioning system. For example, a trusted external server may perform a Diffie-Hellman key exchange with each support device in the user device network. The trusted external server may then transmit the secret shares to their corresponding devices.

Provided m is less then n, it is possible to reconstruct the polynomial P(x) given m secret shares. This is a consequence of the fact that m unique points uniquely define a polynomial of degree m−1. It may be possible to reconstruct the polynomial via a form of polynomial interpolation, such as the use of Lagrange Polynomials.

Once the polynomial is constructed, the value P(O) can be determined and used as part of a cryptographic process. For example, the value P(O) may be used by the encryption device as a cryptographic key. Alternatively, the secret shares and the shared secret may be used as part of a more complex operation such that their value is disguised. Instead of P(O) being reconstructed, a value derived from or associated with P(O) may be reconstructed. Further, the generated value is usually associated with a cryptographic nonce, a one-time randomly generated value. In this way the shared secret remains hidden, but the values derived from it can be generated consistently by encrypting and decrypting devices. Thus the value can be used as a symmetric encryption key or be used to derive a symmetric encryption key, enabling the encryption device to produce an authentication cryptogram and the decryption device to decrypt it.

Shamir's secret sharing is one of many methods used to distribute secret shares such that a shared secret may be reconstructed. There are many other such methods, and the description above is intended only as a non-limiting example. For further details see PCT Application No. PCT/US2018/025089, which is herein incorporated by reference in its entirety for all purposes.

D. System Overview

Figure 2:
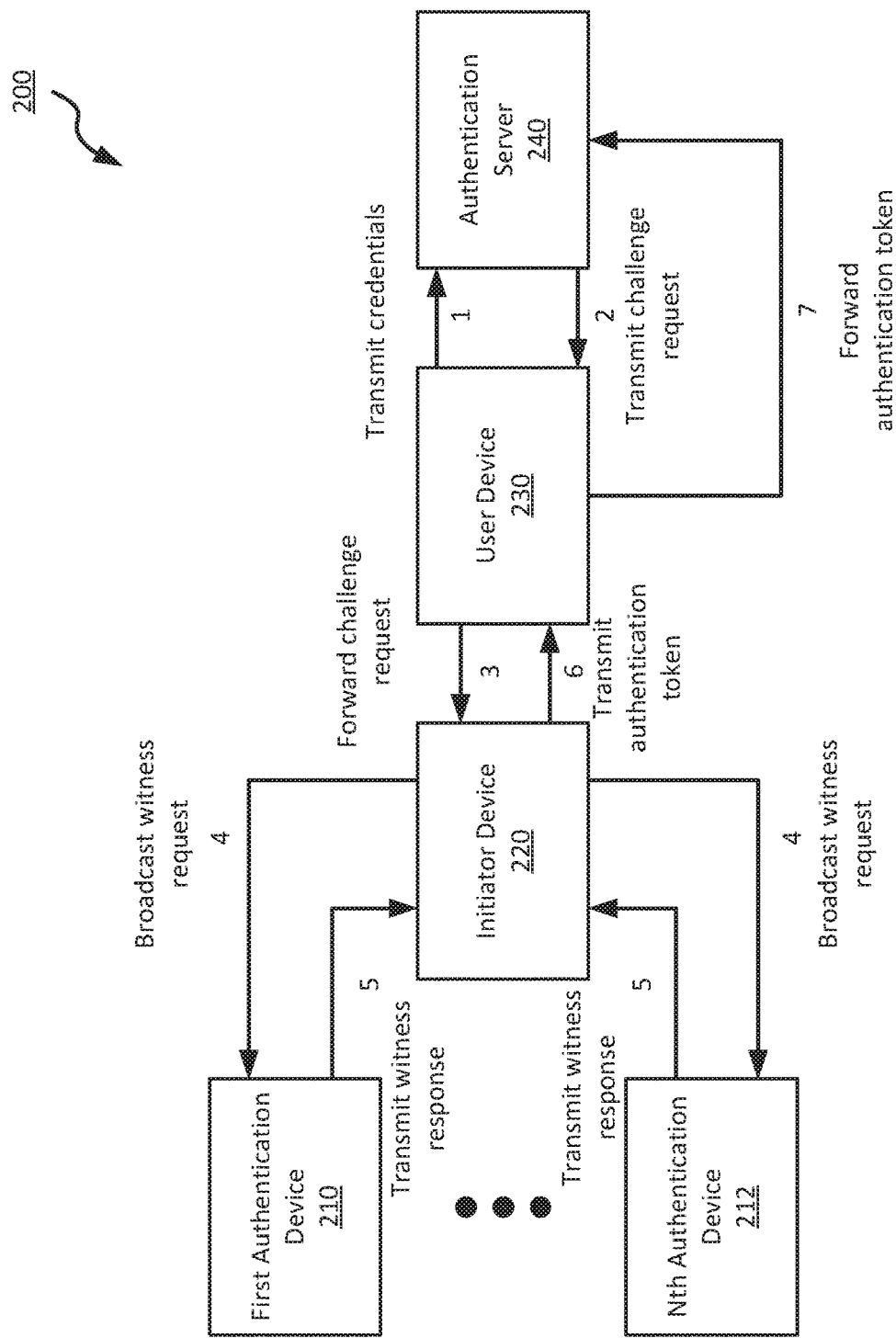
FIG. 2 shows a block diagram illustrating a collaborative risk-aware authentication system according to embodiments of the disclosure.

FIG. 2 shows a block diagram of a system 200 comprising a number of components according to some embodiments of the disclosure. System 200 comprises a first authentication device 210 through an Nth authentication device 212, an initiator device 220, a user device 230, and an authentication server 240.

The first authentication device 210 can be in operative communication with the Nth authentication device 212. In some embodiments, there can be any suitable number of authentication devices, e.g., 3, 4, 5, 10, etc. Each authentication device can be in operative communication with one another.

The initiator device 220 can be in operative communication with each authentication device (e.g., the first authentication device 210 and the Nth authentication device 212) as well as the user device 230. In some embodiments, the initiator device 220 can be in operative communication with the authentication server 240. The user device 230 can be in operative communication with the initiator device 220 as well as the authentication server 240.

Messages between the entities, providers, networks, and devices illustrated in FIG. 2 may be transmitted using a communication network using secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The first authentication device 210, the Nth authentication device 212, the initiator device 220, and the user device 230 can be all be user devices, as they are owned and/or operated by a user. These devices (i.e., the first authentication device 210, the Nth authentication device 212, the initiator device 220, and the user device 230) can include electronic devices such as laptops, desktop computers, voice-controlled assistants, smart phones, smart watches, smart cars, smart TVs, videogame consoles, etc. In some embodiments, the user device 230 can be the initiator device 220.

As an example, the user device 230 can be a laptop computer that the user can operate to communicate with the authentication server 240. The initiator device 220 can be the user's smart phone that can be in communication (e.g., Bluetooth communication) with the initiator device 220. The first authentication device 210 and the Nth authentication device 212 can be a smart TV and a voice-controlled assistant, respectively.

The authentication server 240 can be a server computer. At step 1, the authentication server 240 can be configured to receive credentials, such as a username and a password, from the user device 230. At step 2, the authentication server 240 can also be configured to generate and transmit a challenge request to the user device 230. In some embodiments, the challenge request can request additional authentication for the user beyond the credentials. At step 7, the authentication server 240 can also be configured to receive and verify an authentication token.

The user device 230 can be configured to receive the credentials from a user and then transmit, at step 1, the credentials to the authentication server 240. The user device 230 can also be configured to receive, at step 2, the challenge request from the authentication server 240 and forward, at step 3, the challenge request to the initiator device 220.

At step 3, the initiator device 220 can be configured to receive the challenge request as well as generate a witness request. In some embodiments, the witness request can include a request for token shares. At step 4, the initiator device 220 can broadcast the witness request to one or more authentication devices (i.e., the first authentication device 210 and the Nth authentication device 212). The initiator device 220 can also be configured to receive, at step 5, at least one witness response comprising a token share and an assurance level from one or more authentication devices. Typically, the initiator device 220 can receive the witness response from each of the one or more authentication devices. However, the imitator device 220 may not receive the witness response from an authentication device due to any number of reasons, such as lost connection, the authentication device lost power, etc. Each witness response can comprise more than one token share, where each token share corresponds to a unique assurance level. For example, the witness response can include three token shares, each of the three token shares corresponding to a different assurance level.

The initiator device 220 can further be configured to determine a highest assurance level and can generate an authentication token from the received token shares for the highest assurance level. The initiator device 220 can also be configured to transmit, at step 6 and 7, the authentication token to the authentication server 240 via the user device 230. In some embodiments, the initiator device 220 can be configured to directly transmit the authentication token to the authentication server 240.

The first authentication device 210 can be configured to receive, at step 4, a witness request from the initiator device 220. The first authentication device 210 can also be configured to determine an assurance level associated with the initiator device based on a trust score. The first authentication device 210 can also be configured to obtain a token share corresponding to the first assurance level and any other token share(s) corresponding to lower assurance levels when assurance levels lower than the first assurance level exist and then transmit, at step 5, the token share(s) to the initiator device 220.

The Nth authentication device 212 can be similar to the first authentication device. In some embodiments, the Nth authentication device 212 can be configured to perform similar functions to the first authentication device 210.

E. Example Usage

Figure 3:
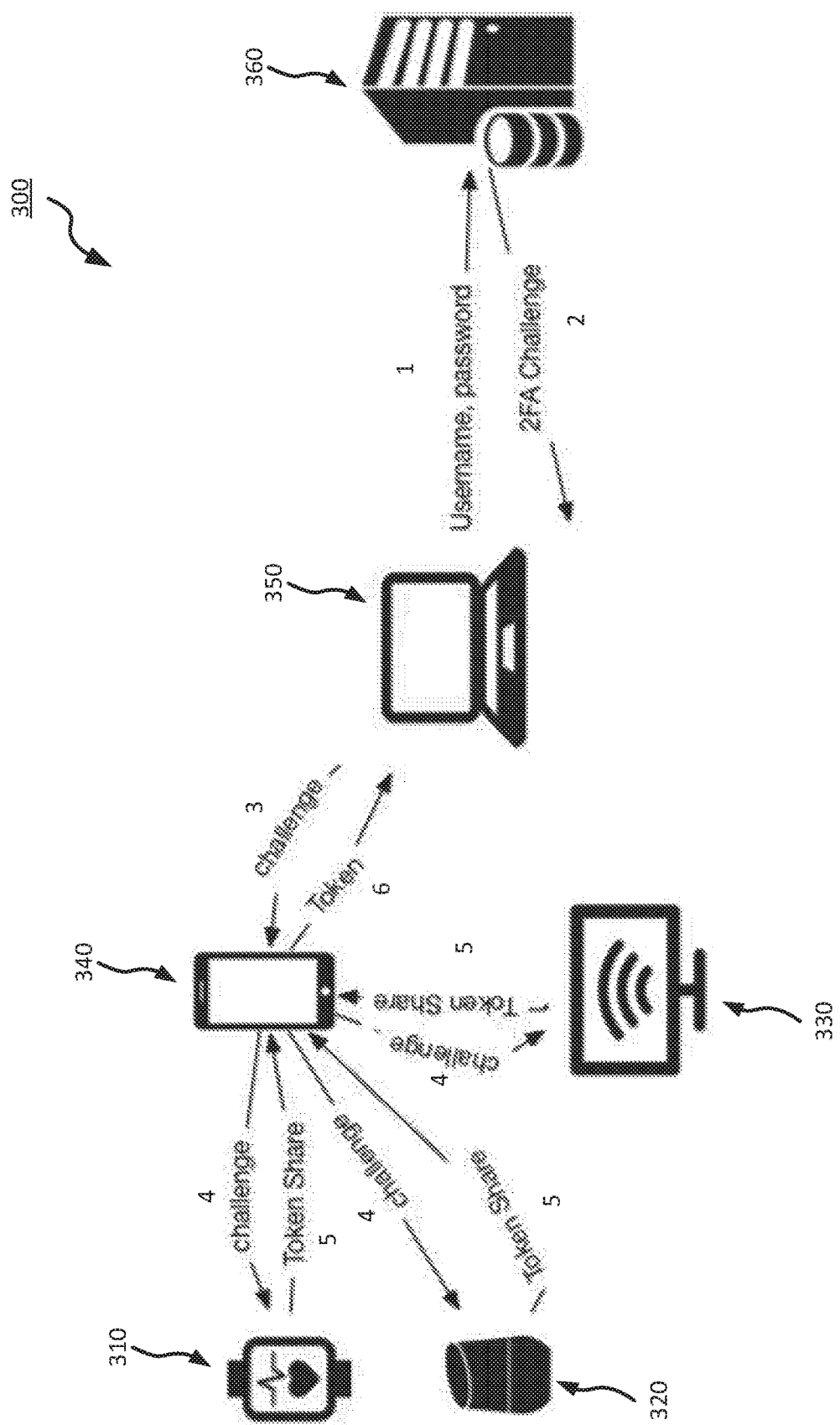
FIG. 3 shows a high-level architecture according to embodiments of the disclosure.

FIG. 3 shows an example set of devices for implementing embodiments of the disclosure. FIG. 3 shows a system 300 comprising a number of components. System 300 comprises a smart watch 310, a voice-controlled assistant 320, a smart TV 330, a smart phone 340, a laptop computer 350, and an authentication server 360. The smart watch 310, the voice-controlled assistant 320, and the smart TV 330 can be authentication devices. The smart phone 340 can be an initiator device. The laptop computer 350 can be a user device.

A user can enter their credentials (e.g., a username and a password) in a browser on the laptop computer 350. At step 1, the laptop computer 350 can transmit the credentials to the authentication server 360. The authentication server 360 can determine whether or not the credentials are valid. If the authentication server 360 can verify the credentials, at step 2, the authentication server 360 can send a MFA challenge (i.e., a challenge request) to the laptop computer 350.

At step 3, after receiving the challenge request, the laptop computer 350 can send the challenge request to the smart phone 340 (or any other present user device). At step 4, the smart phone 340 can initiate communication with one or more authentication devices by sending a witness request message to user devices that are in close proximity (e.g., 10 feet, 20 feet, 50 feet, 200 feet, etc. which can depend on the communication channel used to transmit the witness request). If the user devices (e.g., the smart watch 310, the voice-controlled assistant 320, and the smart TV 330) trust the smart phone 340 (as determined using trust scores) as well as determine that the smart phone 340 is in proximity, the authentication devices can collaborate with the smart phone 340 to generate a MAC (e.g., an authentication token) for the challenge. At step 5, the smart watch 310, the voice-controlled assistant 320, and the smart TV 330 can transmit token shares to the smart phone 340.

After the smart phone 340 generates the authentication token, at step 6, the smart phone 340 can transmit the authentication token as well as a corresponding assurance level to the laptop computer 350 and/or the authentication server 360. Upon receiving the authentication token, the authentication server 360 can verify the authentication token and can determine whether or not the user can be authenticated.

Figure 4:
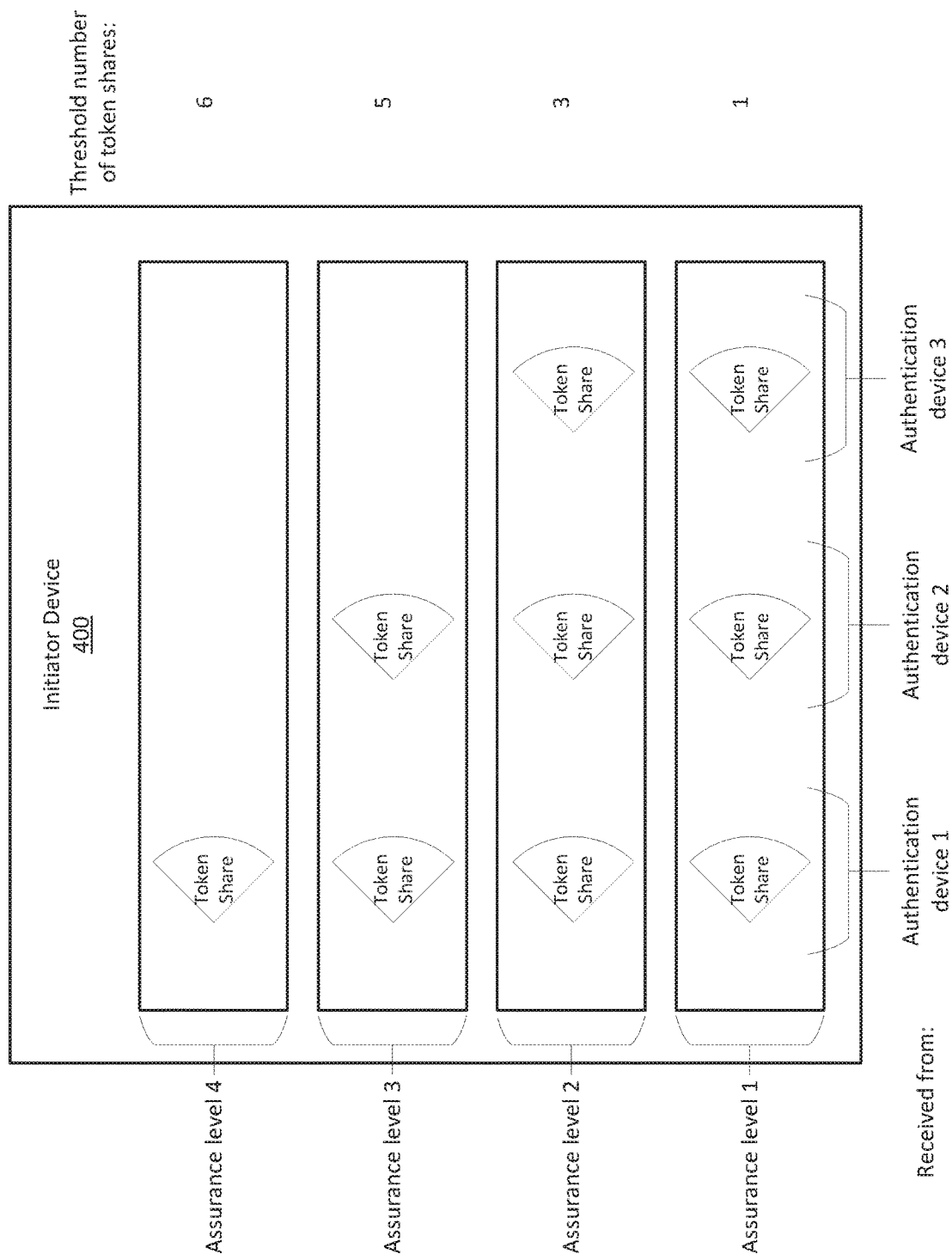
FIG. 4 shows token shares received by an initiator device according to embodiments of the disclosure.

FIG. 4 shows token shares received by an initiator device 400. The initiator device 400 can be the smart phone 340. The smart phone 340 can receive token shares from authentication devices such as the smart watch 310, the voice-controlled assistant 320, and the smart TV 330, labeled as authentication device 1, authentication device 2, and authentication device 3, respectively. Each token share that the smart phone 340 receives can be associated with an assurance level. The token shares shown can be stored, for example, in a memory or other suitable storage component.

During step 5 of FIG. 3, described above, the smart phone 340 can receive token shares from the authentication devices. The token shares received by the smart phone 340 are depicted in FIG. 4. The smart phone 340 can receive four token shares from the authentication device 1 including a token share corresponding to each of assurance level 4, assurance level 3, assurance level 2, and assurance level 1. The smart phone 340 can receive three token shares from authentication device 2 including a token share corresponding to each of assurance level 3, assurance level 2, and assurance level 1. The smart phone 340 can also receive two token shares from authentication device 3 including a token share corresponding to assurance level 2 and a token share corresponding to assurance level 1.

In order to determine the authentication token for a particular assurance level, the smart phone 340 can determine if there are at least a threshold number of token shares corresponding to a particular assurance level. For example, the threshold number of token shares corresponding to assurance level 4 can be equal to 6, the threshold number of token shares corresponding to assurance level 3 can be equal to 5, the threshold number of token shares corresponding to assurance level 2 can be equal to 3, the threshold number of token shares corresponding to assurance level 1 can be equal to 1. Each assurance level can correspond to any suitable threshold number of token shares.

The smart phone 340 can determine that it does not hold at least 6 token shares for assurance level 4. The smart phone 340 can then determine that it does not hold at least 5 token shares for assurance level 3. The smart phone 340 can then determine that it holds at least 3 token shares for assurance level 2. The smart phone 340 can then combine the three token shares corresponding to assurance level 2 using any suitable method described herein. In this example, a threshold number of token shares is described, however it is understood that an amount of token shares can be determined and compared to a threshold amount of token shares, as described in further detail herein.

F. Initiator Device

Figure 5:
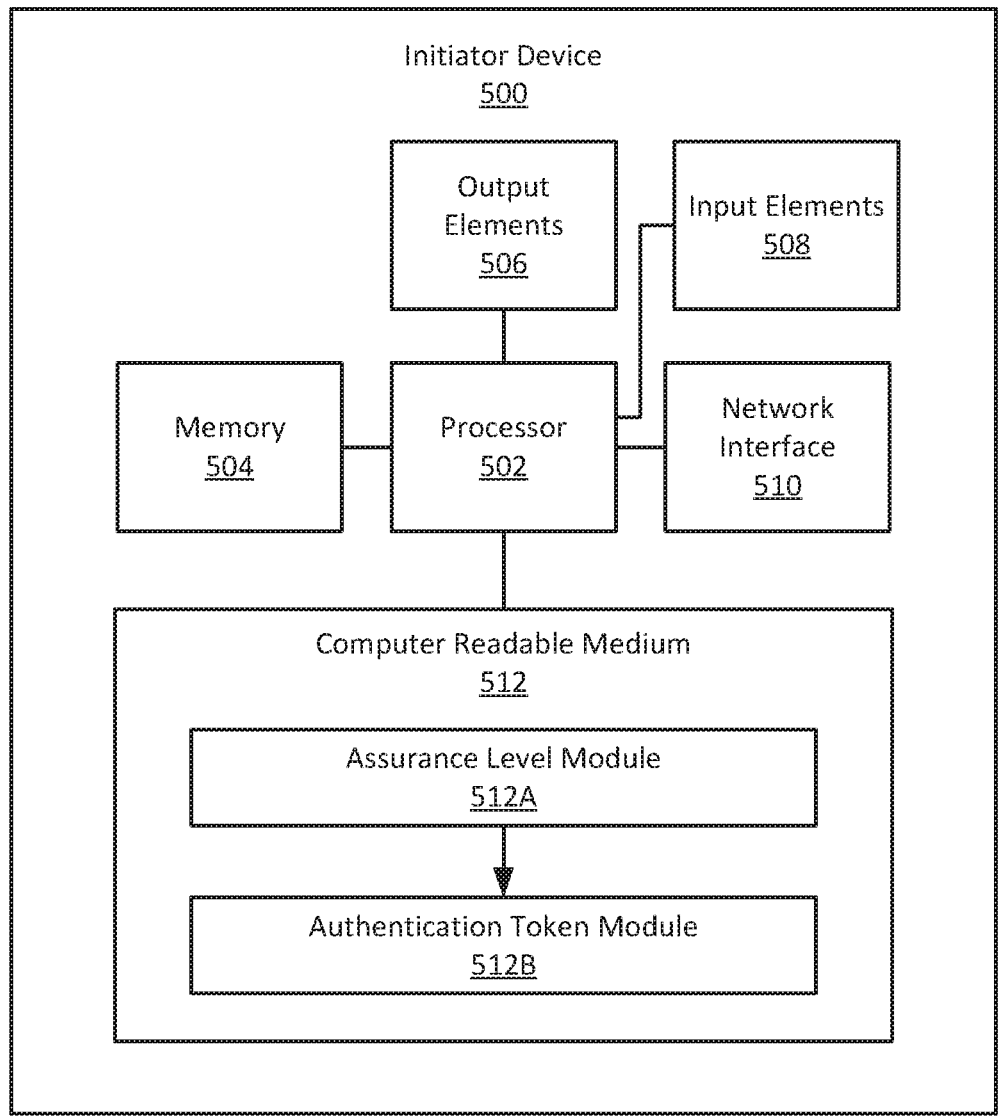
FIG. 5 shows a block diagram illustrating an initiator device according to embodiments of the disclosure.

FIG. 5 shows an initiator device 500 according to embodiments of the disclosure. The exemplary initiator device 500 can comprise a processor 502. The processor 502 may be coupled to a memory 504, output elements 506, input elements 508, a network interface 510, and a computer readable medium 512. The computer readable medium 512 can comprise an assurance level module 512A and an authentication token module 512B. In some embodiments, the computer readable medium 512 can also comprise a trust score module, which can be similar to a trust score module 612A, described in further detail below.

Memory 504 may be any suitable memory capable of storing data, information, and/or code. The memory 504 may store key shares, token shares, and/or trust score(s). The memory 504 can be a secure memory. The key shares, token shares, and trust score(s) can be determined using any suitable method described herein, for example, using the assurance level module 512A, the authentication token module 512B, and a trust score module, respectively.

The one or more output elements 506 can comprise any suitable device(s) that may output data. Examples of output elements 506 may include display screens, speakers, and data transmission devices.

The one or more input elements 508 can include any suitable device(s) capable of inputting data into the initiator device 500. Examples of input devices include buttons, touchscreens, touch pads, microphones, etc.

The computer readable medium 512 can comprise code, executable by the processor 502, to implement a method comprising: broadcasting, by a initiator device, a witness request to one or more authentication devices, wherein the one or more authentication devices determine an assurance level from a range of assurance levels and determine a token share corresponding to the assurance level; receiving, by the initiator device from the one or more authentication devices, at least one witness response comprising the token share corresponding to the assurance level; generating, by the initiator device, an authentication token using a set of token shares; and transmitting, by the initiator device, the authentication token to an authentication server, wherein the authentication server verifies the authentication token.

The assurance level module 512A can comprise code or software, executable by the processor 502 for determining an assurance level. For example, the assurance level module 512A can determine an assurance level based on trust score(s), a time of authentication, a location of authentication, authentication history, user preferences, token share(s), etc. The assurance level module 512A can determine a highest assurance level of a range of assurance levels. The range of assurance levels can be associated with a set of token shares that are received from authentication device(s). The assurance level module can determine a highest assurance level that include at least a threshold number of token shares.

In some embodiments, the assurance level module 512A can determine the first assurance level of the range of assurance levels associated with the set of token shares that include at least a threshold amount of token shares by comparing a previously determined first amount to the threshold amount. The first amount of token shares can be determined by summing weights of the set of token shares. In some embodiments, a higher value for a weight can indicate that the token share is more secure.

Each token share can be associated with an assurance level. In some embodiments, the initiator device 500 can receive a data item including a token share and an assurance level. The data item can include two data fields, one data field including the token share, and a second data field including the corresponding assurance level.

For example, the range of assurance levels may include five assurance levels (e.g., assurance level 1, assurance level 2, and assurance level 3). The assurance level module 512A can determine that the initiator device 500 holds seven token shares in the set of token shares. The five token shares can include one token share at assurance level 3, three token shares at assurance level 2, and three token shares at assurance level 1. If the threshold number of token shares for assurance level 3 is equal to two token shares, then the assurance level module 512A can determine that the initiator device 500 does not have enough token shares at assurance level 3 to create an authentication token at assurance level 3. The assurance level module 512A can then evaluate the next assurance level (e.g., assurance level 2). If the threshold number of token shares for assurance level 3 is equal to two token shares, then the assurance level module 512A can determine that the initiator device 500 has enough token shares at assurance level 2 to create an authentication token at assurance level 2. The assurance level module 512A can determine that the highest assurance level is assurance level 2.

The authentication token module 512B can comprise code or software, executable by the processor 502 for generating an authentication token. The authentication token module 512B can be capable of generating the authentication token using a set of token shares, received from one or more authentication devices, associated with the highest assurance level.

The network interface 510 can include an interface that can allow the initiator device 500 to communicate with external computers. The network interface 510 can enable the initiator device 500 to communicate data to and from another device (e.g., user devices, authentication devices, authentication servers, etc.). Some examples of the network interface 510 can include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 510 may include Wi-Fi™. Data transferred via the network interface 510 can be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 510 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

G. Authentication Device

Figure 6:
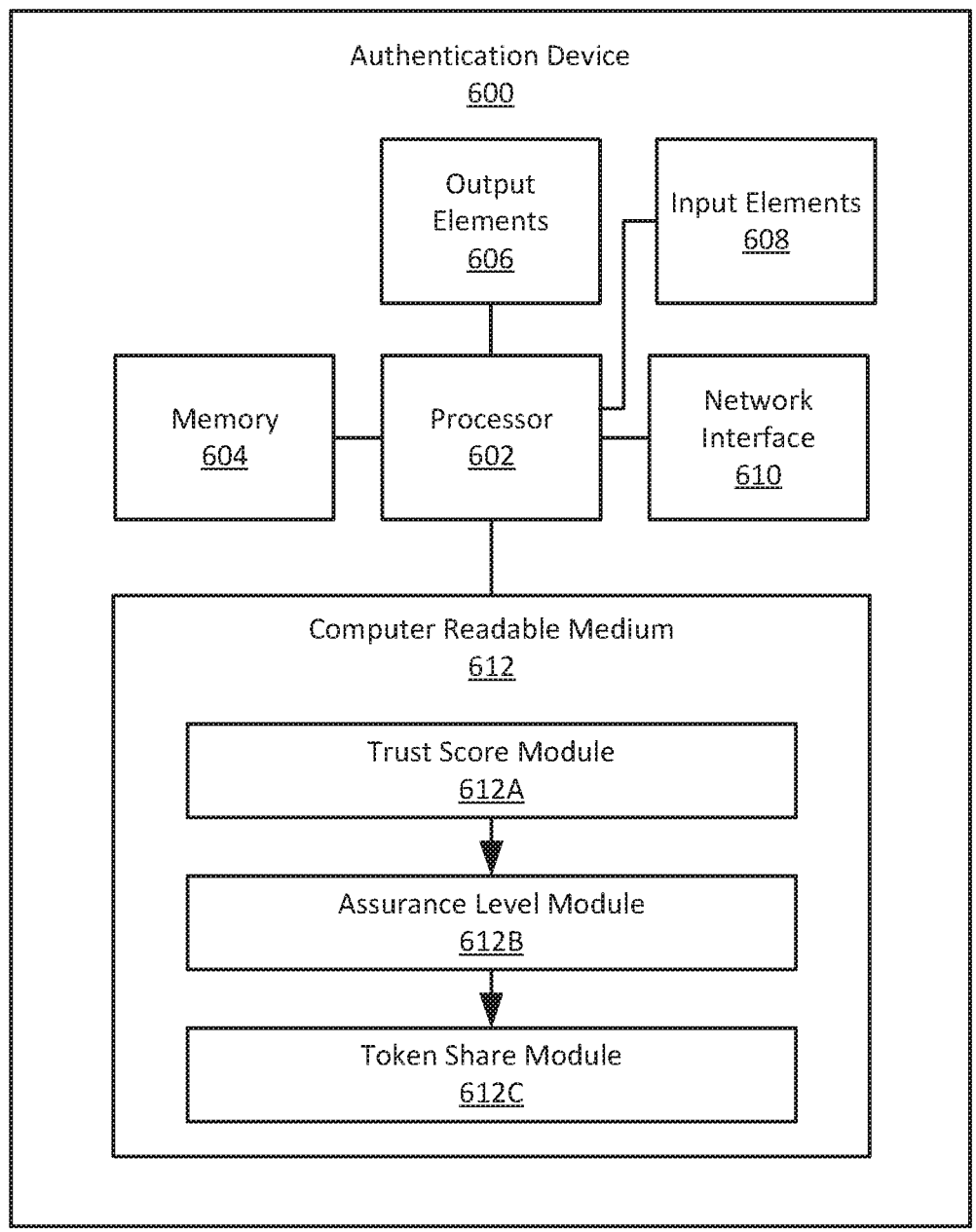
FIG. 6 shows a block diagram illustrating an authentication device according to embodiments of the disclosure.

FIG. 6 shows an authentication device 600 according to embodiments of the disclosure. The exemplary authentication device 600 can comprise a processor 602. The processor 602 can be coupled to a memory 604, output elements 606, input elements 608, a network interface 610, and a computer readable medium 612. The computer readable medium 612 can comprise a trust score module 612A, an assurance level module 612B, and a token share module 612C.

The memory 604 may be any suitable memory capable of storing data, information, and/or code. The memory 604 may store key shares, token shares, and/or trust scores. The memory 604 can be a secure memory.

The one or more output elements 606 can be similar to the one or more output elements 506, the one or more input elements 608 can be similar to the one or more input elements 508, and the network interface 510 can be similar to the network interface 510 and will not be repeated here.

The computer readable medium 612 can comprise code, executable by the processor 602, to implement a method comprising: receiving, by an authentication device from an initiator device, a witness request; determining, by the authentication device, a first assurance level associated with the initiator device based on a trust score, the first assurance level determined from a range of assurance levels; obtaining, by the authentication device, a token share corresponding to the first assurance level; and transmitting, by the authentication device to the initiator device, the token share for the first assurance level.

The trust score module 612A can comprise code or software, executable by the processor 602 for determining a trust score. The trust score module 612A can determine the trust score (of the authentication device 600) based on features observed locally by the authentication device 600, data received from other devices, and/or trust scores received by other devices. For example, the authentication device 600 can receive data from other devices, such as, network data which can include data transmission rates (e.g., kb/s over a window of time such as 1 second, 2 seconds, 5 seconds, etc.), data reception rates, average size of data packets, source addresses, domain name system (DNS) information, IP addresses, hostnames, signal strength data, Wi-Fi connection data, etc. The trust score module 612A can also determine the trust score based on data and/or features such as payment history (e.g., how often a device performs payments, merchant information, transaction amounts, etc.), device configurations (e.g., software versions, secure element data, etc.), previous cryptographic threshold data (e.g., a record of past successful and/or unsuccessful interactions, a record of how often a device participates in authentication, etc.), and trust scores received from other devices in the system. In some embodiments, the trust score module 612A can determine the trust score using a machine learning algorithm, such as a decision tree, neural network, and regression (e.g., logistic or linear). For example, the decision tree can determine a decision based on the aforementioned network data as well as any other suitable data. In some embodiments, some features such as transmission rates may be weighted more in a machine learning model than other features such as IP address when determining a trust score.

The network data can affect the trust score. For example, the trust score module 612A can determine a lower trust score for an initiator device (i.e., that it is less trustworthy) if the network data indicates that the initiator device has much higher than average transmission rates (e.g., the initiator device transmits 3-10 times more data than other devices). As another example, if the network data indicates that an initiator device has low data reception rates, then the trust score module 612A can determine a lower trust score, since the initiator device is not receiving messages from other devices. For example, this can indicate that other devices do not trust the initiator device.

Further, if the network data indicates that an initiator device is transmitting data packets that are approximately the same size as an average data packet size, then the trust score module 612A can determine a higher trust score for the initiator device (i.e., that it is more trustworthy).

As yet another example, the trust score module 612A can determine a small trust score if an initiator device has an IP address, a hostname, domain name system information, and/or a source address that is included on a blacklist. The trust score module 612A can, for example, compare the IP address of the initiator device to a plurality of IP addresses included on a stored blacklist. If the IP address of the initiator matches an IP address included on the stored blacklist, then the trust score module 612A can determine a low trust score (e.g., 0). for the initiator device.

The trust score module 612A can determine the trust score based on signal strength data. For example, if the signal strength data indicates a low signal strength between the authentication device 600 and the initiator device, then the trust score module 612A can determine a low trust score. Conversely, if the signal strength data indicates a strong signal between the two devices, then the trust score module can determine a higher trust score. Additionally, in some embodiments, if the network data indicates that the authentication device 600 can the initiator device are connected via a Wi-Fi connection, then the trust score module 612A can determine a higher trust score. In some embodiments, the trust score module 612A can determine the trust score using a combination of the methods described herein.

For example, in some embodiments, the trust score module 612A can determine the trust score using distributed intrusion detection techniques as described in [7, 15].

In some embodiments, the trust score module 612A can determine one or more trust scores, where each trust score corresponds to a different device in the network (e.g., user devices). As an example, the one or more trust scores based on transitive trust established by Eigen-Trust as described in [10].

The trust score module 612A can output trust score(s). The trust score(s) can be used as input to the assurance level module 612B, where the authentication device 600 can determine an assurance level that the authentication device 600 will participate in during the authentication process.

The assurance level module 612B can comprise code or software, executable by the processor 602 for determining an assurance level. The assurance level module 612B can be similar to the assurance level module 512A. For example, the assurance level module 612B can determine the assurance level based on trust score(s), a time of authentication, a location of authentication, authentication history, user preferences, etc. The assurance level module 612B can determine a first assurance level based on a trust score. The first assurance level can be the highest assurance level that the authentication device 600 determines to participate at. The trust score can be the trust score associated with the initiator device. The first assurance level can be determined from a range of assurance levels as described herein.

In some embodiments, the assurance level can be decided based on the trust score of the initiator as well as based on the proximity of (i.e., distance from) the initiator device from the perspective of authentication device 600. The proximity can be include in proximity data. For example, if the authentication device 600 determines that the IP address (or other suitable data item, such as a GPS location) indicates that the initiator device is located far from the authentication device 600 (e.g., in a different country), then the assurance level can be lower than if the authentication device 600 determines that the initiator device is nearby (e.g., in the same zip code, city, building, etc.).

In other embodiments, the assurance level module 612B can determine the assurance level based on the trust score of an initiator device. As an illustrative example, the assurance level module 612B can retrieve the trust score from the trust score module 612A. For example, the trust score may be a value of 90 of a possible range of 1-100. The trust score of 90 may correspond to a highly trusted device. The assurance level module 612B can determine the assurance level corresponding to the trust score of 90 may be assurance level 1 as determined from a predetermined conversion table. For example, trust scores of 80-100 can correspond to assurance level 1, trust scores of 50-80 can correspond to assurance level 2, and trust scores of 0-50 can correspond to assurance level 3. It is understood, however, that the assurance level module 612B may calculate the corresponding level rather than using a predetermined conversion table.

The assurance level module 612B can output the first assurance level. The authentication device 600 can input the first assurance level into the token share module 612C, where the authentication device 600 can determine a token share corresponding to the first assurance level.

The token share module 612C can comprise code or software, executable by the processor 602 for obtaining a token share. In some embodiments, the token share module 612C can be capable of retrieving token share(s) from a secure memory. The token share module 612C can obtain a token share for a determined first assurance level and any other token share(s) corresponding to lower assurance levels when assurance levels lower than the first assurance level exist.

For example, the token share module 612C can determine a token share based on a key share. The token share module 612C can identify a key share, stored in memory 604, associated with the previously determined assurance level (e.g., assurance level 2). The token share module 612C can determine the token share based on the key share in any suitable manner. For example, the token share can be a predetermined number of digits of the key share. As another example, the token share can be determined by XORing a stored value, such as a device identifier, with the key share.

In some embodiments, the token share module 612C can determine the token share by using a key share (e.g., a secret key share) and authentication data (i.e., used to authenticate the device). The token share module 612C can compute the token share using a threshold MAC or signature approach as known to one of skill in the art. For example, the token share module 612C can determine the token share using AES-MAC, DDH-MAC, RSA-sig, or BLS-sig.

H. Classes of Devices

Figure 7:
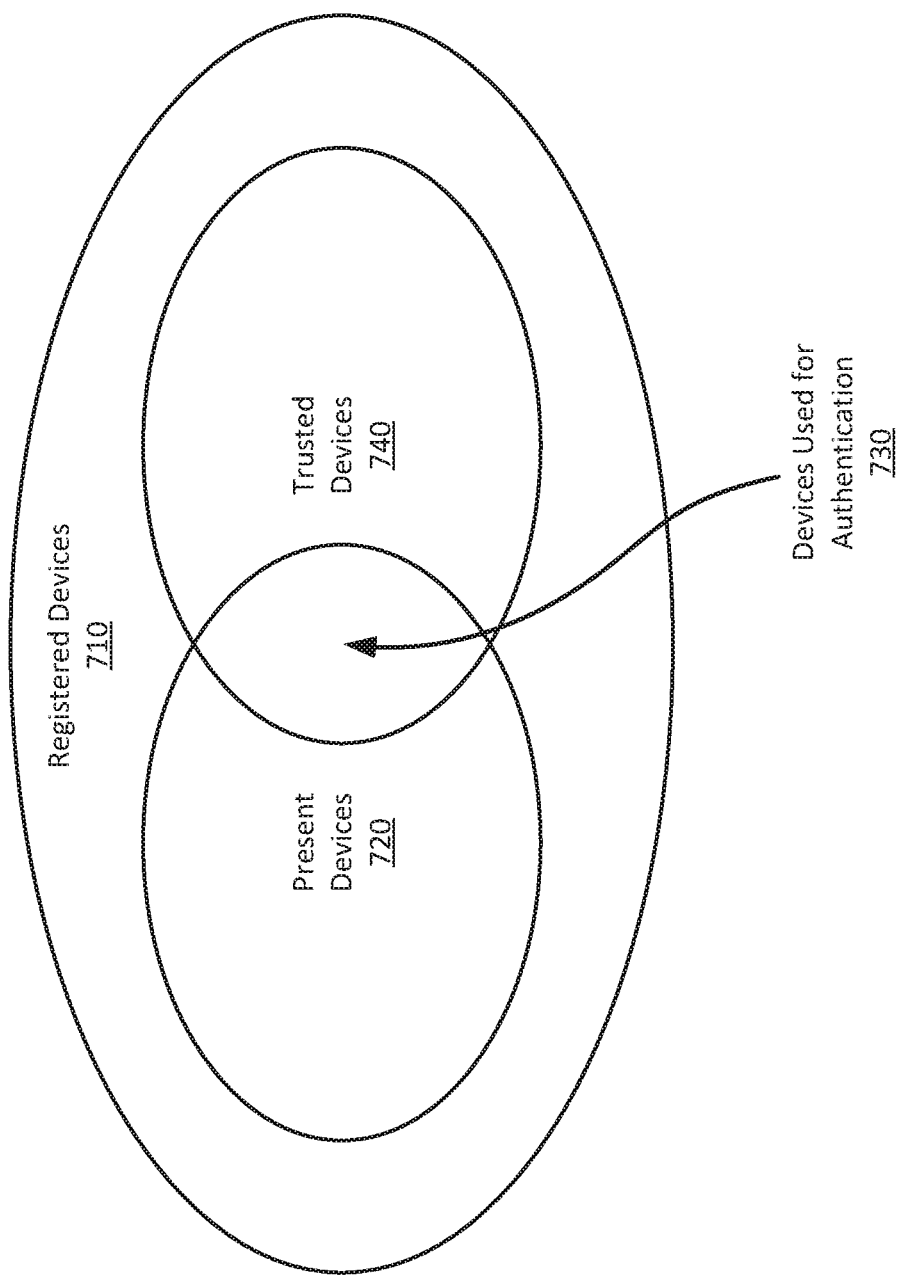
FIG. 7 shows an illustration of classes of devices according to embodiments of the disclosure.

FIG. 7 shows classes of devices according to embodiments of the disclosure. FIG. 7 includes registered devices 710, present devices 720, devices used for authentication 730, and trusted devices 740. FIG. 7 illustrates that the present devices 720, the devices used for authentication 730, and the trusted devices 740 are all within the registered devices 710. If a devices is not registered, then the devices may not participate in an authentication process and may not be considered present and trusted.

In some embodiments, a first device determine that a second device is a trusted device 740. The first device can determine a trust score corresponding to the second device. If the trust score is higher than a predetermined trust threshold, then the first device can determine that the second device is a trusted device 740. For example, the first device can determine the trust score corresponding to the second device to be equal to a value of 7. If the predetermined trust threshold is equal to a value of 2, then the first device can determine to that the second device can be considered a trusted device 740. However, if the first device determines the trust score to be equal to a value of 1, then the first device can determine not to trust the second device.

Devices that are registered devices 710 can be include in the present devices 720 and/or the trusted devices 740. If a devices is registered, present, and trusted, then the devices can be included in the devices used for authentication 730.

V. METHODS

Next, methods according to embodiments of the disclosure will be discussed. First various authentication mechanisms will be discussed. Then the determination and use of trust scores will be described. Then authentication methods according to embodiments of the disclosure will be discussed along with registration as well as removal of devices.

A. Trust-Score Determination

Embodiments of the disclosure can improve threshold cryptography by adding a decision making phase prior to participation in an authentication process. Each user device can check a trust score of the initiator device (as determined by that user device) and can decide if and in what level to participate in the threshold authentication procedure, e.g., by contributing to a MAC. The trust score of the initiator device is based on 1) features observed locally by the participating device (i.e., authentication device) and 2) scores received from a network. In some embodiments, the trust score can be determined by a trust meter.

Each user device can determine a trust score based on network data. There is a rich body of work on distributed intrusion detection and more specifically intrusion detection for IoT devices, see [15; 7]. Embodiments of the disclosure can take advantage of the advanced techniques in lightweight anomaly detection to build a trust meter. Each user device can develop an opinion (i.e., trust score) about peer user devices based on the information it gathers about the peer user devices. SVELTE is a Real-time intrusion detection in the Internet of Things [15] that can detect network attacks by passively observing network traffic. This work shows that their intrusion detection is lightweight enough to run on IoT devices. Features such as packet size, destination, source, number of bytes received per second, number of authentication requests, time of requests, parameters of the authentication request can improve the accuracy of finding malicious activity and perceiving an accurate trust score about a device's neighbors. Other examples of distributed intrusion detection and more specifically intrusion detection for IoT devices can be found in [34, 26, 15, 7, 31, 29].

Table 2, below, lists four anomaly detection schemes designed for IoT systems. SVELTE [15] shows an intrusion detection process that is light enough to run on IoT devices, and is described above. The recent work of Doshi et al. [7] detects DDoS attacks with high accuracy however in a centralized manner. ProFiot [29] detects device compromise by analyzing sensor data. IoT-IDM [31] detects malicious activity of devices by analyzing their network traffic in a centralized manner using one device to monitor and analyze traffic. For embodiments of the disclosure, a network-based distributed intrusion detection scheme works best and therefore, we find SVELTE [15] the most suitable option.

TABLE 2

(A comparison of IoT anomaly detection methods)

| Detector | Model | Threat | Accuracy |
| --- | --- | --- | --- |
| SVELTE [15] | Distributed | Routing | 90-100% |
| ML-IoT [7] | Centralized | DDoS | 99.9% |
| IoT-IDM [31] | Centralized | Device | 96.2-100% |
| ProFiOt [29] | Centralized | Device | 93.7% |

Each user device can propagate trust scores to one another in a network. Each user device can adjust a local trust score using data (e.g., trust scores, network data, etc.) advertised by peer user devices. The adjustment can be based on the idea of transitive trust established by Eigen-Trust, as described in [10]. A user device can trust the opinion of the peer user devices that the user device trusts. To calculate the trust score of $node_i$ in $node_j$ (shown as $T_{ij}$, a weighted average is used where the weight is the trust of $node_i$ in its neighbor):

$$TS_{ij} = \Sigma_k(T_{ik} \times T_{kj})$$

B. Authentication

Figure 8:
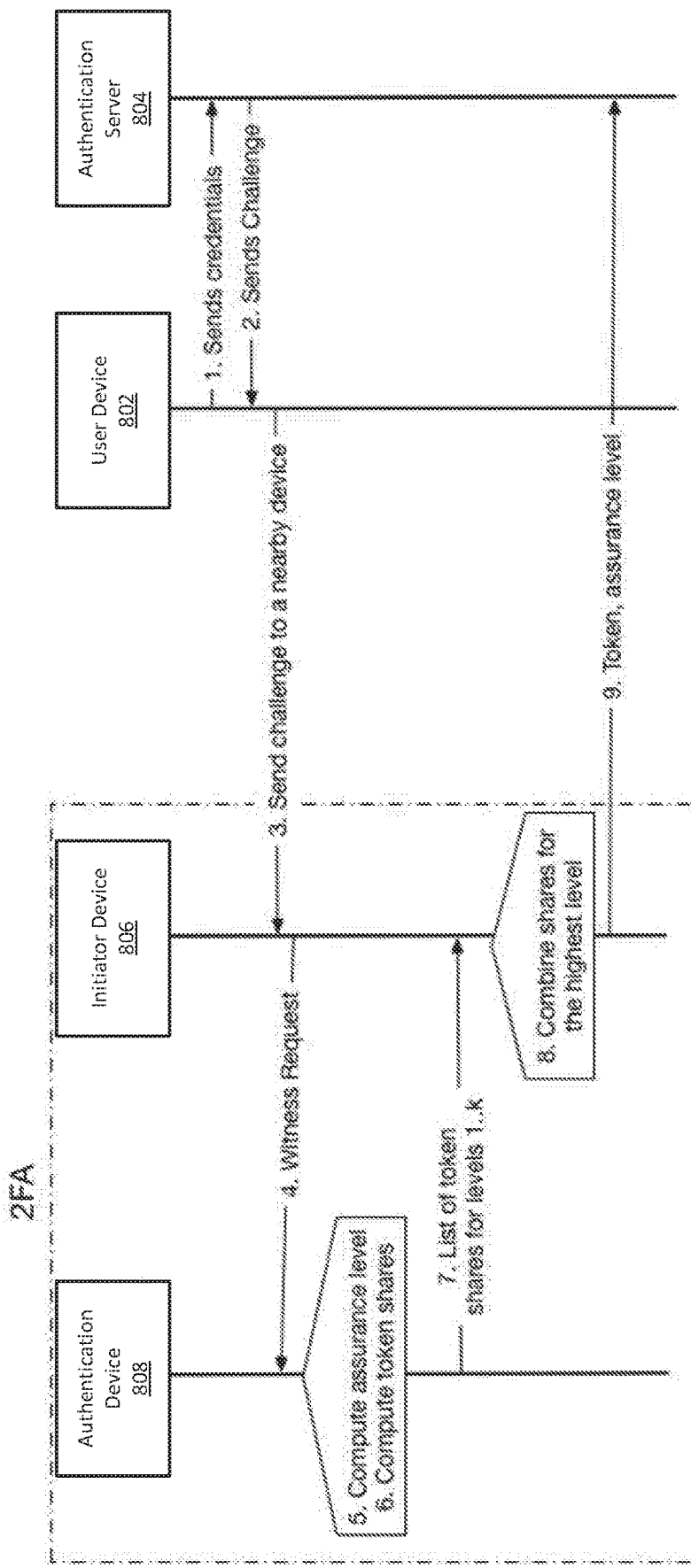
FIG. 8 shows a flow diagram illustrating an authentication method according to embodiments of the disclosure.

FIG. 8 shows flow diagram illustrating an authentication method according to embodiments of the disclosure. The method illustrated in FIG. 8 will be described in the context of a user performing authentication to access a secure website. It is understood, however, that the disclosure can be applied to other circumstances (e.g., with more or less user devices, the user authenticating for a payment transaction, for access to a location, and/or for access to secure data, etc.) in which authentication is performed. Although the steps are illustrated in a specific order, it is understood that embodiments of the disclosure may include methods that have the steps in different orders. In addition, steps may be omitted or added and may still be within embodiments of the disclosure.

At step 1, a user can enter credentials into a user device 802. The credentials can include, for example, a username and a password. The user can input the credentials into the user device 802 in any suitable manner. For example, in some embodiments, the user can type the credentials into a text and/or data field on a website. The user may have previously signed-up or registered with the website. In other embodiments, the user can speak a command to a voice-controlled assistant which can be the user device 802. The user device 802 can record the command including the credentials.

In any case, after receiving the credentials from the user, the user device 802 can send the credentials to an authentication server 804. For example, if the user entered the credentials into a webpage on the user device 802, the user device 802 can transmit the credentials to a backend server associated with the webpage, which can be the authentication server 804. The credentials can be transmitted to the authentication server 804 over any suitable communication channel described herein.

After receiving the credentials from the user device 802, the authentication server 804 can determine whether or not the credentials are valid. In some embodiments, the credentials can be compared to previously stored credentials to determine whether or not they match. In other embodiments, the authentication server 804 can create a hash of the credentials to compare to a stored hash of the credentials. For example, the authentication server 804 can be coupled to a database that stores hashed passwords and/or otherwise encrypted credentials that can be used to determine whether or not received credentials are valid. In some embodiments, valid credentials will be referred to as authentic credentials.

If the authentication server 804 determines that the credentials are not valid, then the authentication server 804 can notify the user device 802 that the credentials are not valid. In some embodiments, the user device 802 may prompt the user to re-enter the credentials.

At step 2, if the authentication server 804 determines that the credentials are valid, then the authentication server 804 can transmit a challenge request to the user device 802. The challenge request can include a request for an authentication token from the user device 802. In some embodiments, the authentication server 804 can transmit the challenge request to an initiator device 806.

At step 3, after receiving the challenge request, the user device 802 can contact the initiator device 806. In some embodiments, the initiator device 806 can be in proximity to the user device 802. For example, the initiator device 806 can be in communication range (e.g., Bluetooth range) of the user device 802. In other embodiments, the initiator device 806 can be a registered device, meaning that the user previously registered the initiator device 806 with the authentication server 804.

In some embodiments, the initiator device 806 can initiate the creation of a witness request based on an internal trigger. For example, rather than receiving a challenge request to prompt the initiator device 806 to broadcast a witness request, the initiator device 806 can determine to broadcast a witness request based on user input. The user can, for example, select for the initiator device 806 to communicate secure credentials with an authentication server 804. The initiator device 806 can determine to broadcast a witness request and then determine an authentication token, as described herein. Then the initiator device 806 can transmit the secure credentials to the authentication server 804 along with the authentication token.

At step 4, the initiator device 806 can broadcast a witness request to one or more authentication devices (i.e., witness (es)) including the authentication device 808. In some embodiments, the initiator device 806 can communicate with each authentication device in communication range. The communication range can vary based on the type of communication channel used, for example, the initiator device 806 can transmit the witness request to the one or more authentication devices via Bluetooth, which can have a communication range of up to approximately 100 meters. In some embodiments, there are be any suitable number of authentication devices in communication with the initiator device 806, for example, approximately in a range of one to ten devices.

The following steps can be performed by one or more authentication devices. After receiving the witness request, the authentication device 808 can determine a trust score associated with the initiator device 806. In other embodiments, the authentication device 808 can periodically determine a trust score associated with the initiator device 806 and can evaluate the most recent trust score when a witness request is received. For example, the authentication device 808 can determine a trust score every 5 minutes, twice an hour, every hour, after and/or before authentication, every 2 hours, once per day, etc. The one or more authentication devices can determine the trust score in any suitable manner described herein.

At step 5, the authentication device 808 can determine if and in what assurance level to participate in authentication. For example, each authentication device can determine a first assurance level associated with the initiator device 806 based on a trust score. The first assurance level can be determined from a range of assurance levels. As an example, the authentication device 808 can store a trust score of 5 out of 5 associated with the initiator device 806. Since the trust score is the highest possible, the authentication device 808 can determine to participate in authentication at a highest assurance level, for example, assurance level 3 (with the other possible assurance levels being level 1 and level 2) when there are three assurance levels.

At step 6, the authentication device 808 can then obtain a token share corresponding to the first assurance level and any other token share(s) corresponding to lower assurance levels when assurance levels lower than the first assurance level exist. For example, the authentication device 808 can obtain a token share corresponding to assurance level 3. The authentication device 808 can also obtain other token share(s) corresponding to lower assurance levels, which can correspond to assurance level 1 and assurance level 2. Therefore, the authentication device 808 can determine three distinct token shares, in this case. In some embodiments, the token share at each different assurance level can be incompatible with one another as they can result from different key shares. In some embodiments, the authentication device 808 can obtain a token share from a secure memory.

In some embodiments, the authentication device 808 can determine the token share, using stored key share(s). For example, the authentication device 808 can store a shared secret, such as a key share corresponding to each assurance level. If there are three assurance levels, then the authentication device 808 can store three key shares. In some embodiments, the key share at a particular assurance level can be a fraction of a cryptographic key, that is shared among the one or more authentication devices and the initiator device. For instance, a 128 bit cryptographic key may be divided among 8 devices, such that each device holds 16 bits of the cryptographic key (i.e., a key share).

For example, in some embodiments, the authentication device 808 can obtain the token share corresponding to the first assurance level and any other token share(s) corresponding to lower assurance levels. The authentication device 808 can obtain the token share and the other token share(s) by retrieving a first key share corresponding to the first assurance level and any other key share(s) corresponding to the any other token share(s). The authentication device 808 can then derive the token share corresponding to the first assurance level from the first key share. The authentication device 808 can then derive the any other token share(s) corresponding to the lower assurance levels from the any other key share(s).

The authentication device 808 can derive the token share for an assurance level using the key share. In some embodiments, the token share can be a predetermined number of bits of the key share. In other embodiments, the token share can be equal to a secret value XORed with the key share.

At step 7, the one or more authentication devices, including the authentication device 808, can transmit a witness response to the initiator device 806. The witness response can include the token share for the first assurance level as well as the other token share(s) for each lower assurance level if assurance levels lower than the first assurance level exist. The initiator device 806 can receive, from the one or more authentication devices, at least one witness response comprising the token share corresponding to the assurance level. In some embodiments, the initiator device 806 can receive a witness response comprising the token share corresponding to the assurance level as well as the assurance level. The token shares received by the initiator device 806 can be referred to as a set of token shares.

For example, in some embodiments, the one or more authentication devices can generate the at least one witness response comprising the token share corresponding to the assurance level. The one or more authentication devices can also include the assurance level in the at least one witness response. In this way, the one or more authentication devices may provide the token share and the assurance level to the initiator device 806.

In other embodiments, the witness request can specify one or more requested assurance levels assurance levels. For example, the initiator device 806 can include a range of assurance levels which it requests to receive from the one or more authentication devices. The specifies one or more requested assurance levels can include any number of assurance levels (e.g., assurance levels 1-3, 5-10, 7, etc.). The one or more authentication devices can then transmit the at least one witness response comprising the token share corresponding to the assurance level to the initiator device 806. The assurance level of the token share included in the witness response can be one of the requested assurance levels. For example, the one or more authentication devices may not need to include the assurance level itself in the witness response message because, in some embodiments, the initiator device 806 can unambiguously map the responses shares to the requested assurance level(s) of the one or more requested assurance levels.

At step 8, after receiving the token share(s) corresponding to the assurance level(s), the initiator device 806 can determine a highest assurance level of a range of assurance levels associated with a set of token shares that include at least a threshold number of token shares. In other words, each token share that the initiator device 806 receives can be associated with an assurance level. For example, the token shares can be sent to the initiator in a list, the first item in the list can correspond to level one, the second item can correspond to level two, etc. The initiator device 806 can determine a threshold number of token shares for each assurance level. For example, assurance level 1 can be associated with a threshold number of token shares equal to 1 token share, while assurance level 2 can be associated with a threshold number of token shares equal to 3 token shares. An assurance level can have any suitable threshold number of token shares and can be predetermined. The initiator device 806 can determine the highest assurance level associated with the set of token shares. In some embodiments, the threshold number of token shares can be predetermined for each assurance level.

For example, the set of token shares can include token shares received from three authentication devices. The token shares from a first authentication device can include three token shares, one token share corresponding to each of assurance level 1, assurance level 2, and assurance level 3. The token shares from a second authentication device can include two token shares, one token share corresponding to assurance level 1 and one token share corresponding to assurance level 2. The token shares from a third authentication device can include two token shares, one token share corresponding to assurance level 1 and one token share corresponding to assurance level 2. The initiator device 806 can determine that the highest assurance level is assurance level 2 since the initiator device 806 received at least a threshold number of token shares (i.e., 3 token shares) corresponding the highest assurance level (i.e., assurance level 2). The initiator device 806 can determine that the highest assurance level is not assurance level 3 since the initiator device 806 received only 1 token share corresponding to assurance level 3. This does not meet the threshold number of token shares needed (i.e., 5 token shares) at assurance level 3.

Further, in some embodiments, the initiator device 806 can obtain an initiator token share corresponding to the highest assurance level that the initiator device 806 determines to participate at as well as any other token share(s) when lower assurance levels exist. The initiator device 806 can include the initiator token share in the set of token shares.

The initiator device 806 can then generate an authentication token using the set of token shares associated with the highest assurance level. For example, if the highest assurance level is assurance level 2 and the initiator device 806 received at least a threshold number of token shares associated with assurance level 2, the initiator device 806 can generate the authentication token corresponding to assurance level 2. The authentication token can be generated in any suitable manner described herein.

At step 9, after generating the authentication token, the initiator device 806 can transmit the authentication token to the authentication server 804. In some embodiments, the initiator device 806 can also transmit the assurance level to the authentication server 804.

In other embodiments, the initiator device 806 can transmit the authentication token to the user device 802 which can forward the authentication token to the authentication server 804.

After receiving the authentication token, the authentication server 804 can verify the authentication token. The authentication server 804 can verify this information against an existing record in order to authenticate the user. In other embodiments, the authentication server 804 can decrypt the authentication token using a suitable encryption key. Once the authentication server 804 successfully decrypts the authentication token with the correct encryption key, the authentication server 804 can compare an expected value and/or data against the value and/or data obtained from decrypting the authentication token.

In some embodiments, the authentication server 804 can also receive the assurance level. The authentication server 804 can then determine an authentication level based on the assurance level. For example, for a higher assurance level, the authentication server 804 can authenticate the user at a higher authentication level.

In some embodiments, the authentication server 804 and the initiator device 806 can further communicate to mutually determine which assurance level of the range of assurance levels is a minimum assurance level for which the initiator device 806 can be authenticated by the authentication server 804. For example, the initiator device 806 can provide two authentication tokens (e.g., a first authentication token corresponding to assurance level 1 and a second authentication token corresponding to assurance level 2) to the authentication server 804. The authentication server 804, upon receiving the authentication tokens, can compare the highest level authentication token (e.g., corresponding to assurance level 2) to a threshold level (e.g., assurance level 3) which may be needed for authentication. After determining that the highest assurance level does not exceed (e.g., equal to or greater than) the threshold level, the authentication server 804 can request further details regarding the witness request, witness response, authentication devices, token shares, and/or any other suitable information relating to the authentication process. For example, the authentication server 804 can request the number of authentication devices which provided token shares to the initiator device 806. In this example, the initiator device 806 can respond with "two devices." The authentication server 804 can then determine that two authentication devices was the minimum number of authentication devices needed to create an authentication token corresponding to assurance level 2, and thus that each authentication device trusts the initiator device 806 to assurance level 2. Based on the number of authentication devices, the authentication server can determine whether or not the initiator device 806 can be authenticated. As another example, if the initiator device 806 responds with "twenty devices," the authentication server 804 can determine that the ratio of the number of authentication devices that provided token shares to the number of authentication devices that did not provide token shares is low. The authentication server 804 can then determine that the initiator device 806 cannot be authenticated.

Pseudocode for a witness request and authentication token generation, below, further explains details of the initiator device 806 requesting token shares from the authentication devices as well as combining received token shares. The tasks of the authentication devices are explained in witness response.

1. Witness Request and Authentication Token Generation

Witness request: to create an authentication token, a node can broadcast a request to peer nodes to collaborate with the node on building the token. The data item "token_shares" can be a list of token shares received from one witness device. The data item "all_shares" can be a list of "token_shares" (i.e., a list of lists of shares). The index of the list (i.e., array) of a data item (e.g., the "token_share") can be the assurance level. For example, the first token share from each response can correspond to assurance level 1, the second token share from each response can correspond to assurance level 2, etc.

```
1:  procedure WITNESSREQUEST
2:      for device ∈ registered_Devices do
3:          sendMsg(device;WITNESS REQUEST)
4:      wait(1Second)
5:      for token_shares ∈ all_shares do
6:          if length(token_shares) ≥ THRESHOLD then
7:              token ←combine(token shares)
8:              token.list+ = token
9:      assuranceLevel ← maxLevel(token_list)
10:     token ← token_list[assuranceLevel]
11:     sendMsg(authenticator; < token; assuranceLevel >)
12: procedure MESSAGERECIEVED(message)  ▷ This procedure handles
    messages received from the witness nodes.
13:     level ← 0
14: for token_share ∈ message do
15:     level++
16:     all_shares [level]+ = token_share
```

In the process above, an authentication token can be created for each assurance level. Multiple authentication tokens can be created, and then the highest assurance level and thus an authentication token from the highest level token shares can be determined. Creating the authentication token for each assurance level before determining the highest assurance level can be beneficial if the highest level authentication token is rejected by the authentication server 804 (for any reason), since the initiator device 806 can simply send the next authentication token in the list (e.g., in "token list"). It is understood, however, that in other embodiments, the initiator device 806 may determine the highest assurance level token and then provide the authentication token determined from the set of token shares associated with the highest assurance level.

2. Witness Response

Witness response: the authentication device can respond to the initiator device with a token share.

```
1:  procedure WITNESS RESPONSE
2:      AL ←AssuranceLevel(TS_{initiator})
3:      for level ≤ AL do
4:          token share ←thresholdSignature(level)
5:          token_share_list+ = token share
6:      sendMsg(initiator; token_share_list)
```

C. Different States of Devices

Figure 9:
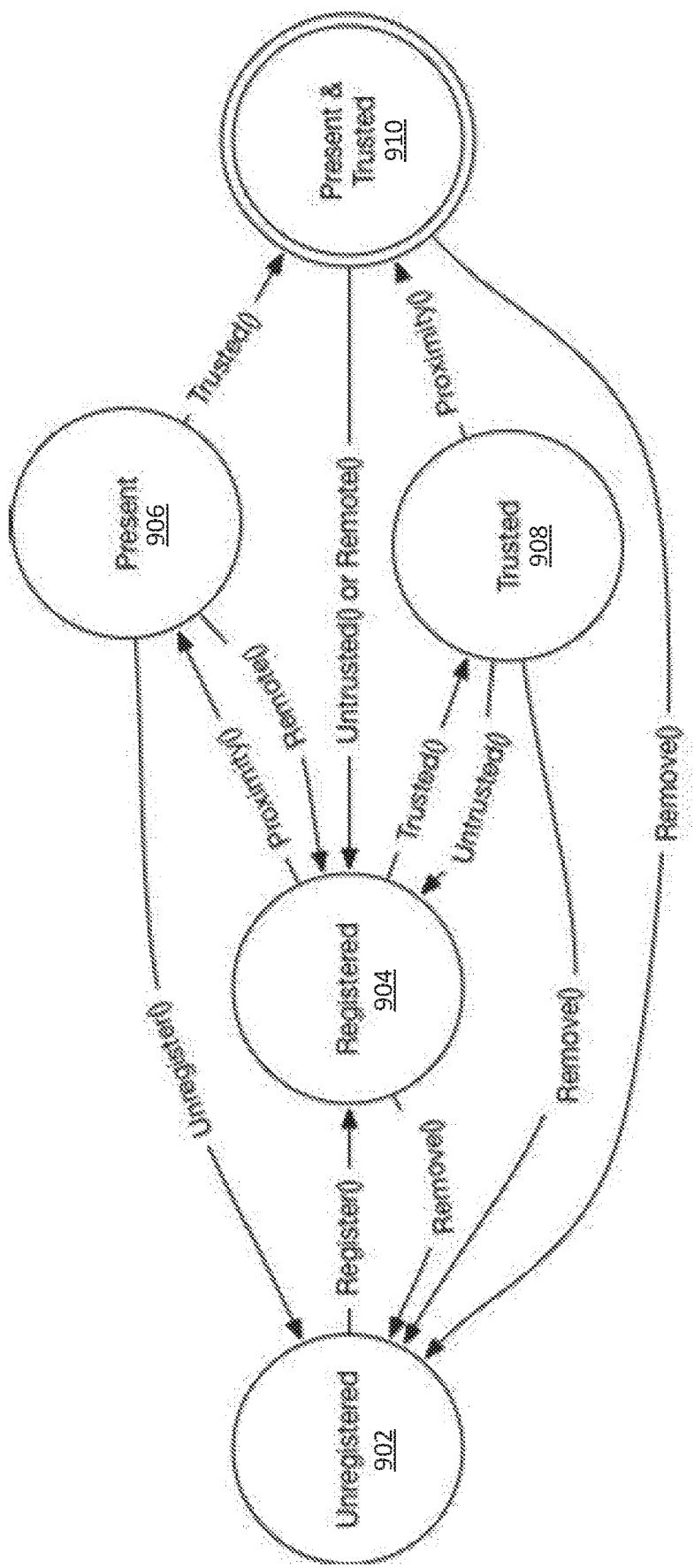
FIG. 9 shows an illustration of a life cycle of a device according to embodiments of the disclosure.

FIG. 9 shows a life cycle of a device according to embodiments of the disclosure. FIG. 9 shows various stages of the life cycle of a device. The stages can include unregistered 902, registered 904, present 906, trusted 908 and present and trusted 910. Different methods show the connections between one stage to another. For example, a device that is unregistered 902 can become registered 904 using a Register( ) method. A device may determine that another device is present using any suitable method (e.g., Bluetooth, sound, etc.). For example, a device may perform a proximity detection method as described in section III. A device may determine a trust score for other devices using any suitable method. For example, trust (i.e., a trust score) can be relative and can represent how much a first device trusts a second device. The trust score for a new device (e.g., the second device) may be set to 100% (assuming the device is secure in the first few days) and first device can lower the trust score of the second device as the second device is seen to act anomalous (e.g., attempting hundreds of authentications an hour).

1. Registration

The registration of a new user device can be done by authenticating the user through user credentials, such as a username and password, and an authentication process as described herein. However, one difference is that since registration of a new user device can be more sensitive, embodiments can ask for user participation and approval. For example, the user may be prompted to confirm registration of the new user device.

A new user device can be registered using the approval of already registered user devices, however, not all user devices can be available and in close proximity at all times. Therefore, embodiments of the disclosure can allow for a graceful registration process. The more user devices that can attest to the addition of the new user device (i.e., provide key shares corresponding to high assurance levels), the higher key shares that the new user device can receive. For example, if the authentication devices have low trust scores for the new user device and provide low assurance level token shares, the new user device may be issued (by the authentication server or other suitable device) key shares corresponding to low assurance level token shares. In this way, if the user's password and/or other credentials are compromised, an attacker can add as many new user devices as it needs. New user devices only receiving token shares corresponding to low assurance levels defends against attackers adding many new user devices to perform authentications at high assurance levels.

Given some already registered user devices, the following steps described how to add a new user device D. 1) The user can log into a user device management portal using their username and password. 2) D can run a discovery algorithm to find its neighbors (i.e., peer user devices) on the same network. 3) D can act as an initiator device, as described herein, and can contact nearby user devices to be authentication devices for registration. 4) Each of the already registered user devices can show a "permission request for new user device" pop-up which the user has to confirm. The registered user devices that receive the user's confirmation can generate a token share and transmit the token share to the new user device. In some embodiments, the registered user device can transmit the token share(s) to a registration server, authentication server, and/or other suitable device. 5) For a token of level t sent to the registration server, the new user device can receive key shares corresponding to that assurance level.

In some embodiments, adding a new user device can increase the threshold, therefore, each of the other already registered user devices can be sent new key shares.

2. Removal of Devices

In removing a user device (i.e., performing a Remove( ) method), all user devices (i.e., in proximity or remote) can be notified to remove that user device from their list of registered user devices. The user devices can also set the trust score associated with the removed user device to zero. If the user is removing a user device, then the removed user device can be wiped clean, thus any key shares can be removed from memory. However, if the removed user device is stolen, the key shares for all levels can be updated on the authenticator side (i.e., by the authentication server) and on the user devices as well. Updating the keys for all user devices may not be efficient, however this is task will not occur frequently.

D. Example Methods

1. Initiator Device

Figure 10:
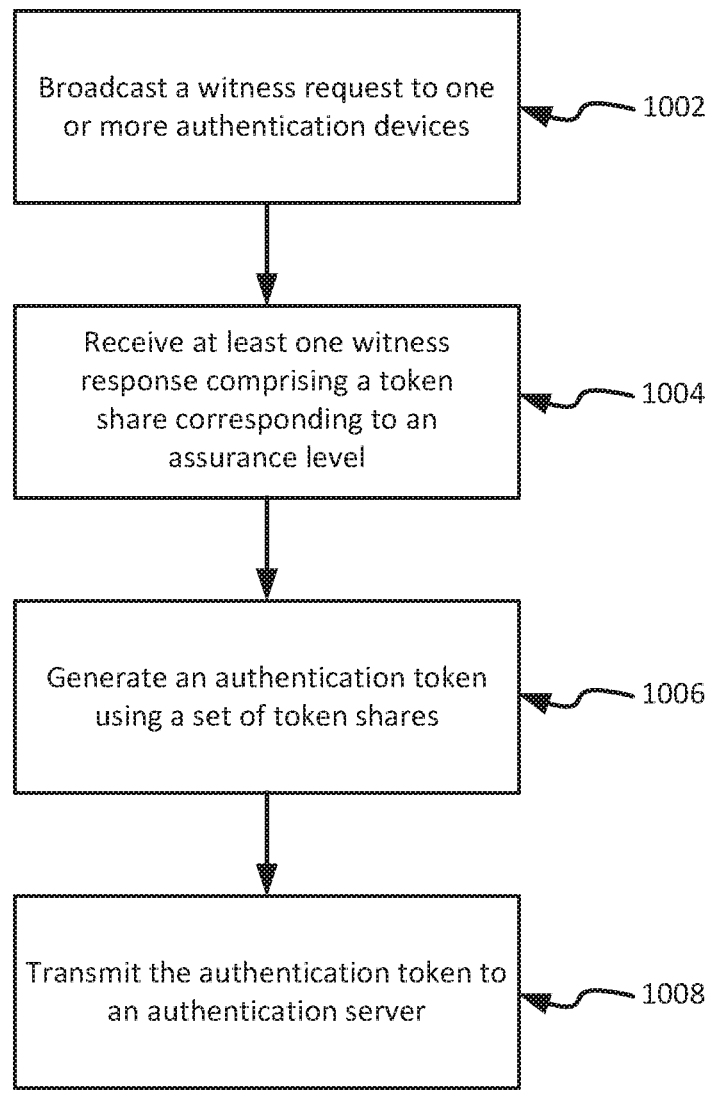
FIG. 10 shows a flow diagram illustrating an authentication token generation method according to embodiments of the disclosure.

FIG. 10 shows a flow diagram illustrating an authentication token generation method according to embodiments of the disclosure. The method illustrated in FIG. 10 will be described in the context of an initiator device broadcasting a witness request requesting token shares for authentication by an authentication server.

At step 1002, the initiator device can broadcast a witness request to one or more authentication devices. For example, the initiator device can broadcast the witness request to any suitable number of authentication devices within range of a Bluetooth communication channel. The witness request can include a request for token shares.

In some embodiments, prior to broadcasting the witness request, the initiator device can receive a challenge request from the authentication server. The challenge request may be in response to the initiator device providing credentials to the authentication server. The challenge request may be a further challenge for authentication. In some embodiments, the challenge request can indicate an assurance level for which the authentication server will authenticate the initiator device. For example, the challenge request can indicate assurance level 3. The authentication server can authenticate the initiator device after receiving an authentication token corresponding to assurance level 3. In some embodiments, the challenge request can be transmitted from the authentication server via a user device to the initiator device.

In other embodiments, prior to broadcasting the witness request, can determine the witness request internally based on, for example, at least one of user input, an internal timer, and a detection of an anomaly. For example, the user can select an option on the initiator device to perform authentication. The initiator device, upon receiving the user input, can determine to broadcast the witness request in order to determine an authentication token.

As another example, the initiator device can determine to broadcast the witness request based on an internal timer. The initiator device can determine to initiate the authentication process, for example, after 5 hours, 3 days, 8 weeks, 6 months, etc.

As yet another example, the initiator device can determine the witness request based on a detection of an anomaly. The initiator device can monitor, for example, network data. The initiator device can compare the network data to any suitable anomaly detection threshold to determine whether or not there is an anomaly. If the initiator device determines that there is an anomaly, the initiator device can broadcast a witness request as a preemptive authentication measure, rather than waiting for a challenge request from the authentication server when authenticating. For example, if there is a large anomaly in the network data (e.g., a significant increase in network traffic), the authentication server may generate challenge requests to provide for additional security during the anomalous event. In light of the anomalous event, the initiator device can preemptively generate the witness request and generate the authentication token to authenticate with the authentication server.

After receiving the witness request, each authentication device of the one or more authentication devices can determine an assurance level from a range of assurance levels. Each authentication device can also determine a token share corresponding to the assurance level. The determination of the assurance level and the token share is described in further detail in, at least, FIG. 11.

At step 1004, the initiator device can then receive at least one witness response comprising the token share corresponding to the assurance level from the one or more authentication devices. The initiator device can receive any suitable number of witness responses. For example, if there are five authentication devices, the initiator device can receive one, two, three, four, or five witness responses. The initiator device can include each received token share corresponding to an assurance level into a set of token shares. Each assurance level of a range of assurance levels can correspond to each set of token shares.

In some embodiments, the at least one witness response can further comprise the assurance level. For example, the one or more authentication devices can, respectively, provide the token share and the assurance level in the witness response transmitted to the initiator device.

In other embodiments, the witness request can specify one or more requested assurance levels. For example, the initiator device, at step 1002, can broadcast the witness request which may specify one or more requested assurance levels (e.g., assurance level 2, 3, 10, 2-4, etc.). The one or more requested assurance levels can include the assurance level corresponding to the token share. For example, an authentication device can include a token share corresponding to an assurance level as specified by the one or more requested assurance levels.

The initiator device can determine a first assurance level of the range of assurance levels associated with the set of token shares that include at least a threshold number of token shares. For example, the first assurance level can be a highest assurance level for which the initiator device holds at least the threshold number of token shares. The threshold number of token shares can include any suitable threshold and may be predetermined. For example, assurance level number 1 may be associated with a threshold number of token shares of 5 shares, whereas assurance level number 3 may be associated with a threshold number of token shares of 4 shares.

In some embodiments, the initiator device can store an initiator token share for each assurance level. The initiator device can obtain the initiator token share corresponding to, for example, the first assurance level and any other token share(s) when lower assurance levels exist when determining the first assurance level.

In other embodiments, the initiator device can determine a first amount of the set of token shares prior to determining the first assurance level. The first amount can be determined in any suitable manner. For example, in some embodiments, each token share may be associated with a weight. The weight may indicate a security level of the originating authentication device. A higher value for a weight can indicate the token share is more secure. The first amount of token shares can be determined by summing weights of the set of token shares.

The weight associated with each token share can be determined, for example, based on characteristics of the authentication device. The characteristics of the authentication device which may influence a weight associated with a token share may include, but are not limited to, how the authentication device protects its own token share(s) (e.g., a tamper resistant container, a pin protected container, etc.).

After determining the first amount, the initiator device can determine the first assurance level of the range of assurance levels associated with the set of token shares that include at least a threshold amount of token shares by comparing the first amount to the threshold amount. In this way, the assurance level may not only determined from the number of token shares, but also based on how each of these token shares are protected and maintained. Some of the token shares may not be desirable if the authentication device is not secure enough (e.g., certain token shares may not be used to claim higher levels of assurance).

At step 1006, after receiving the at least one witness response, the initiator device can generate an authentication token using a set of token shares. The initiator device can generate the authentication token in any suitable manner described herein. For example, the initiator device can remove duplicate token shares from the set of token shares and then XOR the remaining token shares from the set of token shares to determine the authentication token.

In some embodiments, the initiator device can generate one or more authentication tokens corresponding to the first assurance level and any lower assurance levels when lower assurance levels exist. For example, the initiator device can receive 6 token shares corresponding to assurance level number 1, 5 token shares corresponding to assurance level number 2, and 2 token shares corresponding to assurance level number 3. Each assurance level can correspond to a threshold number of token shares, or in some embodiments a threshold amount of token shares, which can be used to generate the authentication token for the level. For example, assurance level number 1 can correspond to a threshold of 5, assurance level number 2 can correspond to a threshold of 4, and assurance level number 3 can correspond to a threshold of 3. The initiator device can generate one authentication token for assurance level number 2 and a second authentication token for assurance level number 1.

At step 1008, after generating the authentication token, the initiator device can transmit the authentication token to an authentication server. The authentication server, after receiving the authentication token, can verify the authentication token.

In some embodiments, the initiator device can also transmit the assurance level to the authentication server. For example, the initiator device can transmit a message, to the authentication server, comprising the assurance level (e.g., assurance level number 3) and the authentication token corresponding to the assurance level.

In other embodiments, the initiator device can transmit one or more authentication tokens after generating one or more authentication tokens. For example, the initiator device can transmit a list, or other suitable data item, to the authentication server comprising one or more authentication tokens and the one or more assurance levels respectively corresponding to the one or more authentication tokens.

2. Authentication Device

Figure 11:
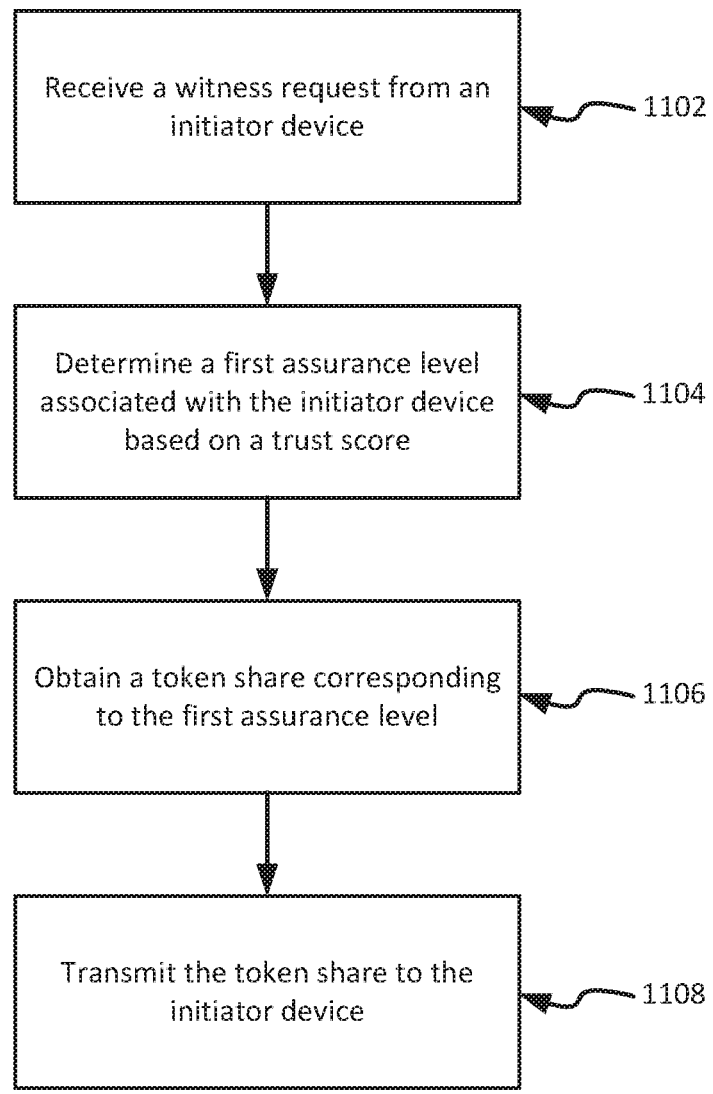
FIG. 11 shows a flow diagram illustrating witness response generation method according to embodiments of the disclosure.

FIG. 11 shows a flow diagram illustrating witness response generation method according to embodiments of the disclosure. The method illustrated in FIG. 11 will be described in the context of an authentication device responding to a witness request from an initiator device during an authentication process. The method described in reference to FIG. 11 will be described as being performed by an authentication device. It is understood, however, that the method of FIG. 11 may be performed by each authentication device of one or more authentication devices.

Prior to step 1102, the initiator device can generate and broadcast a witness request, as described in detail herein. At step 1102, the authentication device can receive the witness request.

At step 1104, after receiving the witness request, the authentication device can determine a first assurance level associated with the initiator device based on a trust score, as described in detail herein. The first assurance level can be determined from a range of assurance levels.

In some embodiments, the authentication device can determine the trust score associated with the initiator device based on at least network data. The network data can include, for example, transmission rates, data reception rates, average size of data packets, source addresses, domain name system information, IP addresses, hostnames, signal strength data, Wi-Fi connection data, etc. The authentication device can determine the trust score, for example, based on a difference between historically typical transmission rates and the transmission rates, a difference between historically typical data reception rates and the data reception rates, and/or a difference between historically typical average size of data packets and the average size of data packets.

In other embodiments, the trust score can be a local trust score (i.e., local to the authentication device). The authentication device can receive one or more remote trust scores from one or more additional authentication devices. After receiving the remote trust scores, the authentication device can determine the trust score using a weighted average of the local trust score and the one or more remote trust scores, as described herein.

In yet other embodiments, the authentication device can determine the trust score based on the type of initiator device. For example, the authentication device can be more trusting of an initiator device that is a desktop computer, which may remain in the user's home, than an initiator device that is a mobile phone, which the user may bring to potentially unsecure locations.

At step 1106, after determining the first assurance level, the authentication device can obtain a token share corresponding to the first assurance level. In some embodiments, the authentication device can also obtain any other token share(s) corresponding to lower assurance levels, when assurance levels lower than the first assurance level exist. For example, the first assurance level may be assurance level number 3. The authentication device can obtain a token share corresponding to assurance level number 3 as well as token shares corresponding to assurance level number 2 and assurance level number 1.

In some embodiments, obtaining the token share corresponding to the first assurance level and any other token share(s) corresponding to lower assurance levels can include retrieving a first key share corresponding to the first assurance level as well as any other key share(s) corresponding to any other token share(s). The authentication device can retrieve the key shares from any suitable memory as described herein. The authentication device can then derive the token share corresponding to the first assurance level from the first key share. Further, the authentication device can derive the any other token share(s) corresponding to the lower assurance levels from the any other key share(s), as described herein. In some embodiments, the first key share and the any other key share(s) can be fractions of a cryptographic key that is shared among the initiator device and one or more authentication devices including the authentication device.

At step 1108, after obtaining the token share(s), the authentication device can transmit the token share for the first assurance level to the initiator device in a witness response. In some embodiments, the authentication device can also transmit the other token share(s) for each lower assurance level to the initiator device in the witness response.

VI. SECURITY ANALYSIS

Next, a security analysis of embodiments of the disclosure as a multi-factor authentication (MFA) will be discussed when the first factor (i.e., the password) has been compromised and an attacker is aiming to maliciously authenticate by defeating the second factor.

Several situations will be discussed including: 1) a remote attacker without a registered user device; 2) context-manipulating adversaries; 3) a remote attacker with a compromised user device; 4) an attacker with a stolen registered user device; and 5) an inside attacker.

A. A Remote Attacker without a Registered User Device

Any attacker that uses an unregistered and unknown device, simply fails to initiate embodiments of the disclosure and fails to compute any authentication tokens of any assurance level since 1) the attacker does not have any key and/or key shares and 2) the user devices with the key shares do not trust the attacker, as the user devices have not seen the unknown device before.

B. Context-Manipulating Adversaries

One major goal of seamless 2FA schemes is to prove that the user authenticating themselves is the one owning/operating the second device (factor). One method to achieve this goal is to prove proximity of the user's first and second device. To prove proximity, different channels have been used: Bluetooth (radio in general), sounds, temperature, and light. There are attacks [18] that can manipulate the environment and what is observed by these channels, also known as context manipulating attackers.

Embodiments of the disclosure defend against these attacks by having multiple user devices collaborate, therefore making it more difficult to coordinate and scale a targeted attack. For example, it is no longer feasible to use a blow-dryer to warm all participating user device simultaneously (e.g., to make all temperature measurements similar among the user devices) and fool the proximity test.

C. A Remote Attacker with a Compromised User Device

An already registered user device that becomes compromised could generate a token of level one (the lowest assurance level) on its own. However, the rest of the user devices in the network can gradually detect the compromised behavior and lower their trust score to zero and would not collaborate with the compromised device. Embodiments of the disclosure allow for a graceful degradation in trust score. At the time of authentication, authentication devices can input the authentication time, origin, and authentication parameters (e.g., amount of payment, username) and then update their local trust score. An unusual authentication request would be detected and the trust score can be adjusted. In some embodiments, this can be left to the server side where all of the authentication information is available. Further, the authentication server has more computational power and bandwidth than the user devices to perform a complete analysis.

D. An Attacker with a Stolen Registered User Device

In the situation of an attacker with a stolen registered user device, the best the attacker can do is to generate a token of level one, since the stolen registered device has enough (i.e., one) share to generate the authentication token. However, since the rest of the user devices cannot verify the proximity of the initiator device, they would be "witness" to this authentication.

E. An Insider Attacker

If the attacker knows the user's password as well as manages to be in close proximity to the user devices (e.g., breaks into the user's house), the attacker has a high chance of success. One way embodiments of the disclosure defends against this attack can be by detecting any anomaly in the request time of a specific initiator device.

For example, most of the payments performed by the user during the day are performed by using the user's phone as the initiator device. If the a voice-controlled assistant initiates an authentication process for the first time, it can be detected as anomalous. The user devices can determine not to participate in token generation. If the trust score fails to detect the anomaly, it can be left to fraud detection services of the authentication server to detect the attack.

VII. EVALUATION

Next, an evaluation of embodiments of the disclosure will be performed. Security and usability of embodiments of the disclosure can be adjusted by the number of user devices the user owns, the number of assurance levels, and the threshold set for the threshold MAC generation. First, two sets of parameters will be considered in the two use cases below. Then, embodiments of the disclosure will be compared against previous work. After that, a comparative analysis of embodiments is provided in the framework of Bonneau et al. [4].

A first use case can include 5 user devices, 1 assurance level, and a threshold of 1. This is the simple case when any of the five registered user devices could be used for authentication, as there is 1 assurance level and any 1 device can assist in the generation a token for the first assurance level. The security of this use case is on par with the security of seamless 2FA using one device. If one device is compromised, authentication can be compromised. However, the usability can be higher as the chances of having one of the five user devices nearby and available is higher.

A second use case can include 5 user devices, 1 assurance level, and a threshold of 5. In this case the user needs to have all five user devices nearby, acting trustworthy, and in a normal environment to collaboratively compute the authentication token. The security of this case can be higher than other seamless 2FA schemes, as the attacker needs to compromise and/or steal all five user devices. The usability can be higher than interactive 2FA, however the usability may be lower than in seamless 2FA in case one of the five user devices is not available.

A. Comparative Analysis

The framework of Bonneau et al. [4] is used to evaluate the security, usability, and deployability of embodiments of the disclosure.

1. Usability

Keeping consistent with the evaluation of previous 2FA schemes, some embodiments may not be memorywise-effortless and scalable-for-Users since the users need to remember credentials, such as a username and a password. However, embodiments can be used for passwordless authentication and in that context it would satisfy the first two usability requirements. Some embodiments, do not require the user to carry any user devices as it can opportunistically take advantage of the user devices around the user. Further, embodiments can fall back to interactive 2FA if no other user device is available. Compared to previous seamless 2FA methods, embodiments score higher in this category because embodiments are not dependent on one specific user device. Similar to all other 2FA schemes, embodiments are not physically effortless, and might encounter errors as the user has to enter a password and might make a mistake.

2. Deployability

In terms of being accessible, embodiments of the disclosure can be similar to other seamless 2FA schemes. Embodiments can have negligible cost per-user. However, as embodiments use threshold MACs, and provide risk information, the authentication server can be updated according to CoRA changes. Some embodiments can be browser-compatible as long as the proximity check method chosen is browser-compatible. If CoRA is used as a passwordless authentication scheme and on the laptop, then it would not be browser-compatible (at least based on its current implementation). CoRA is accessible and has negligible-cost-per-user especially since it could work with any smart device that the user has available.

3. Security

The system, according to embodiments of the disclosure, is resilient-to-internal-observation since it generates a new token for each authentication and no one user device stores the whole key. CoRA on its own can be unlinkable and highly privacy preserving as it does not send the same information to multiple authentication servers. Embodiments of the disclosure can also have a new security metric, resilient to-context-manipulation based on the attacks shown in the paper of Shrestha et al. [18]. Google 2SV (2-step verification) and passwords are immune to such attacks, phoneAuth could be compromised by attacks on the Bluetooth, and soundproof is vulnerable to sound manipulation [19]. Embodiments of the disclosure are more secure against context manipulating attacks since the system can have diversity, for example, as each user device could have a different channel for proximity verification.

B. Accuracy Evaluation

Accuracy evaluation can be performed using a metric which can include fraud rate parameters, such as network topology (e.g., connectivity, number of nodes), accuracy of TM, delay of detection, delay of propagation, number of attackers, type of attackers, etc. In some embodiments, an attacker can be malicious in regards to network behavior that is leaking information and denial of service attacks. In other embodiments, the attacker can be malicious in regards to a trust meter that is advertising wrong trust scores for other devices but acting benign in all other aspects. In yet other embodiments, the attacker can be malicious in regards to threshold cryptography that is sabotaging the computation by sending incorrect information instead of the correct token share, but acting benign in all other aspects.

FIG. 12 shows a table comparing usability and deployability between embodiments of the disclosure other MFA and 2FA schemes. FIG. 13 shows a table comparing security between embodiments of the disclosure other MFA and 2FA schemes.

Figure 14:
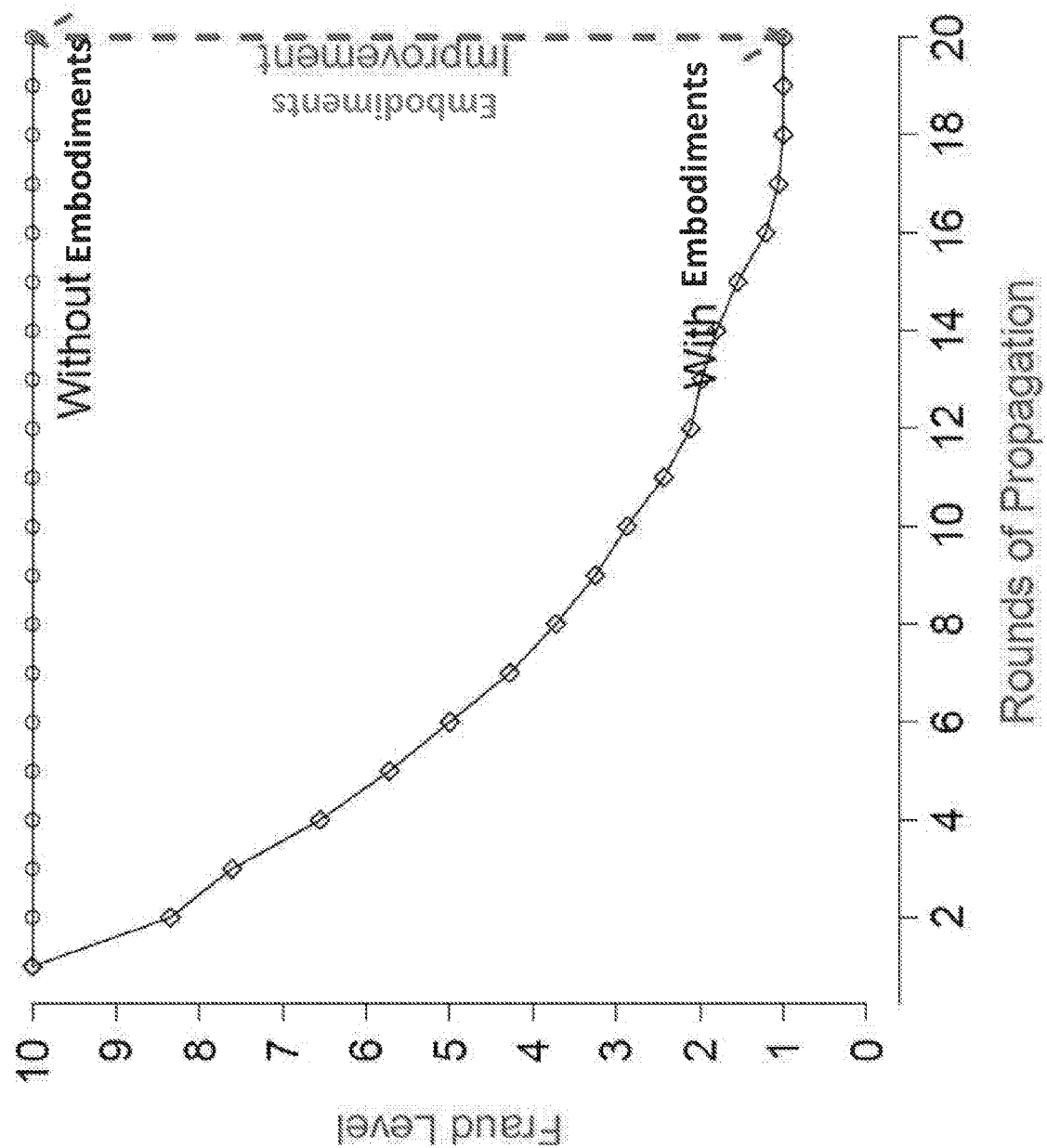
FIG. 14 shows a graph of the security improvement according to embodiments of the disclosure.

FIG. 14 shows the number of rounds of trust meter needed for all the nodes (i.e., user devices) to catch a malicious initiator device. Some embodiments of the disclosure allow for a graceful degradation of the authentication level, a property that is not provided by today's secret sharing schemes. In this experiment, the network has 10 nodes, which are all connected, and one compromised node that tries to authenticate itself. There are four nodes in the network that can directly observe the malicious behavior of the malicious node and run an anomaly detector with the accuracy of 0.90. Trust information can travel through the network. After 5 rounds, all nodes can update their trust score associated with the malicious node. At this point each node does not trust the malicious node enough to help the malicious node in authentication. The best that the malicious node can do is to authenticate itself at assurance level one.

Figure 15:
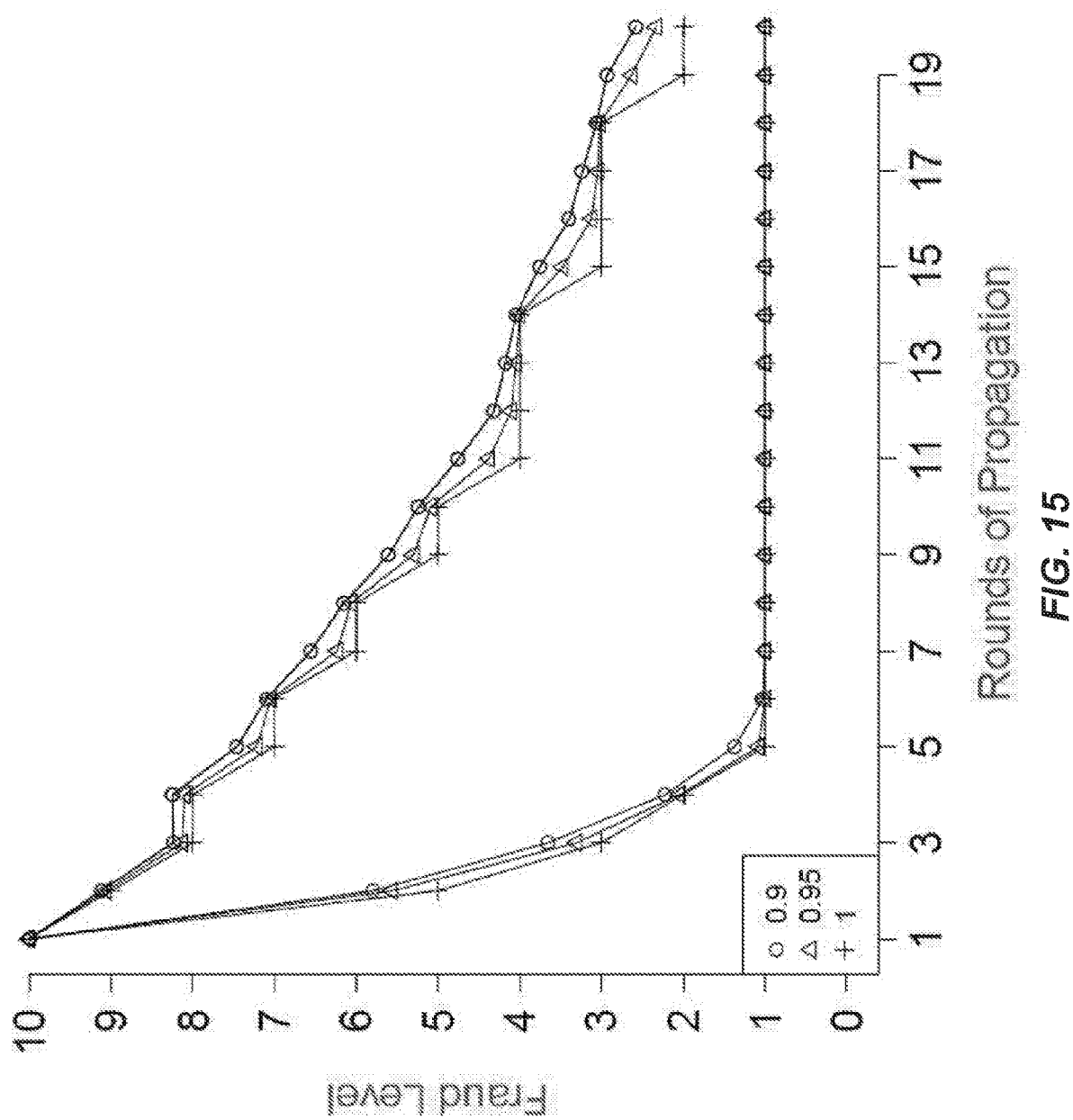
FIG. 15 shows a graph of the effect of the number of whistle blowers according to embodiments of the disclosure.

FIG. 15 presents the effect of number of whistle blowers in the system by showing two extreme cases where there is one whistle blower in the network (e.g., only a router observes the anomalous behavior) versus when every node in the network can directly catch the anomalous behavior of a malicious node. For a network where not all nodes have direct connections to observe the malicious behavior, the frequency of running trust meter should be higher to compensate for the slow detection.

Figure 16:
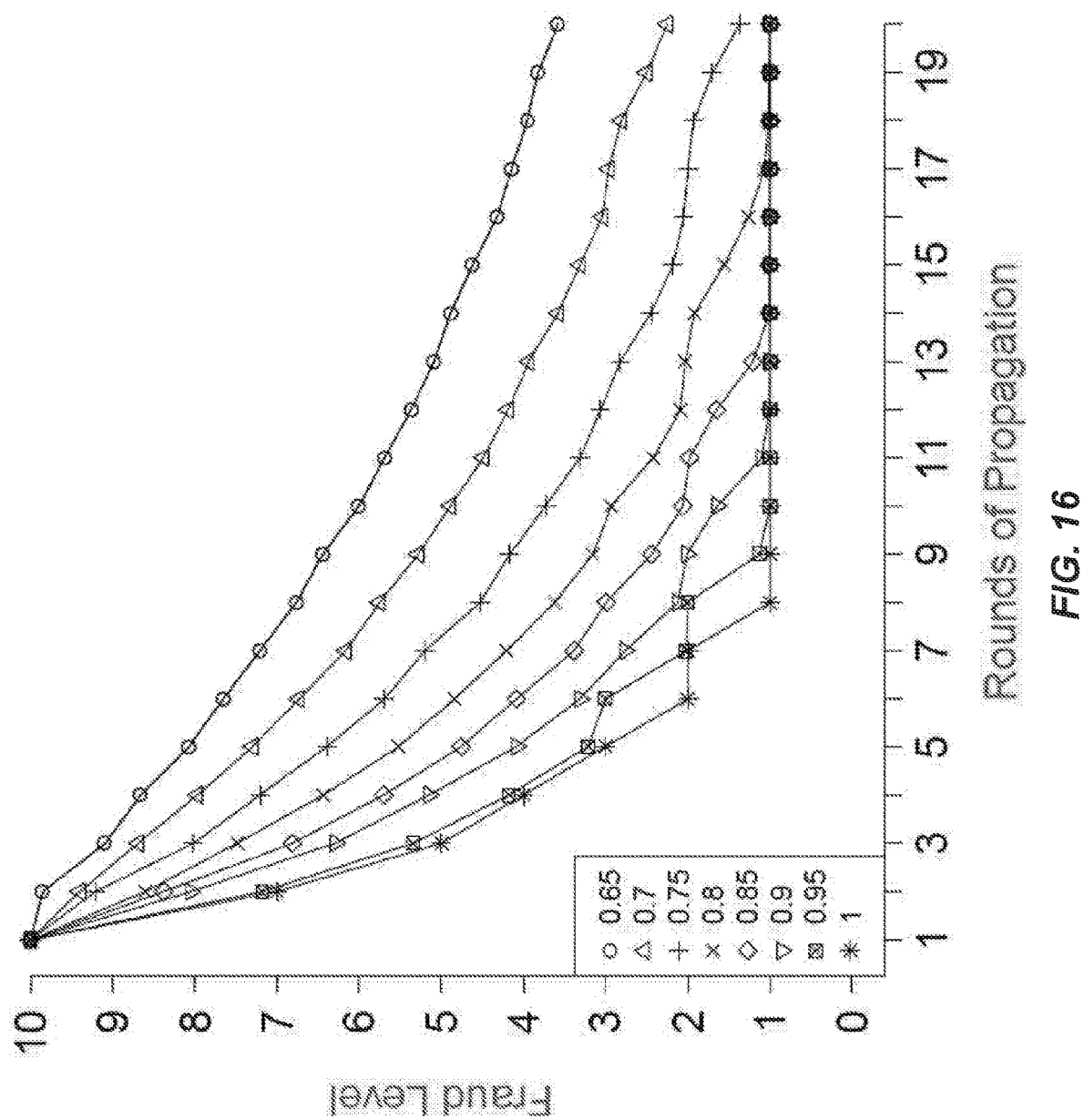
FIG. 16 shows a graph of the effect of trust meter accuracy according to embodiments of the disclosure.

FIG. 16 demonstrates the effect of accuracy of the trust meter on how fast the compromised node could be detected. In this example, there are four whistle blower nodes. The accuracy is changed from 0.65 to 1. The trust score is updated based on the accuracy. The results show that while accuracy plays a role, even with a low precision trust meter, after about 20 rounds, the malicious node would be isolated. In terms of application settings, if the trust meter has low accuracy, one could run the trust meter more often to increase the chance of catching the attacker.

By propagating trust score to other nodes, all the nodes in the network can converge on a trust view. In situations when all nodes could not observe the malicious behavior of the malicious node directly, the whistle blowers could propagate the information to the rest of the network. If each device only acts on its own local observations, the malicious node may always be able to collaboratively generate a token at the level of number of nodes minus the number of whistle blowers.

Figure 17:
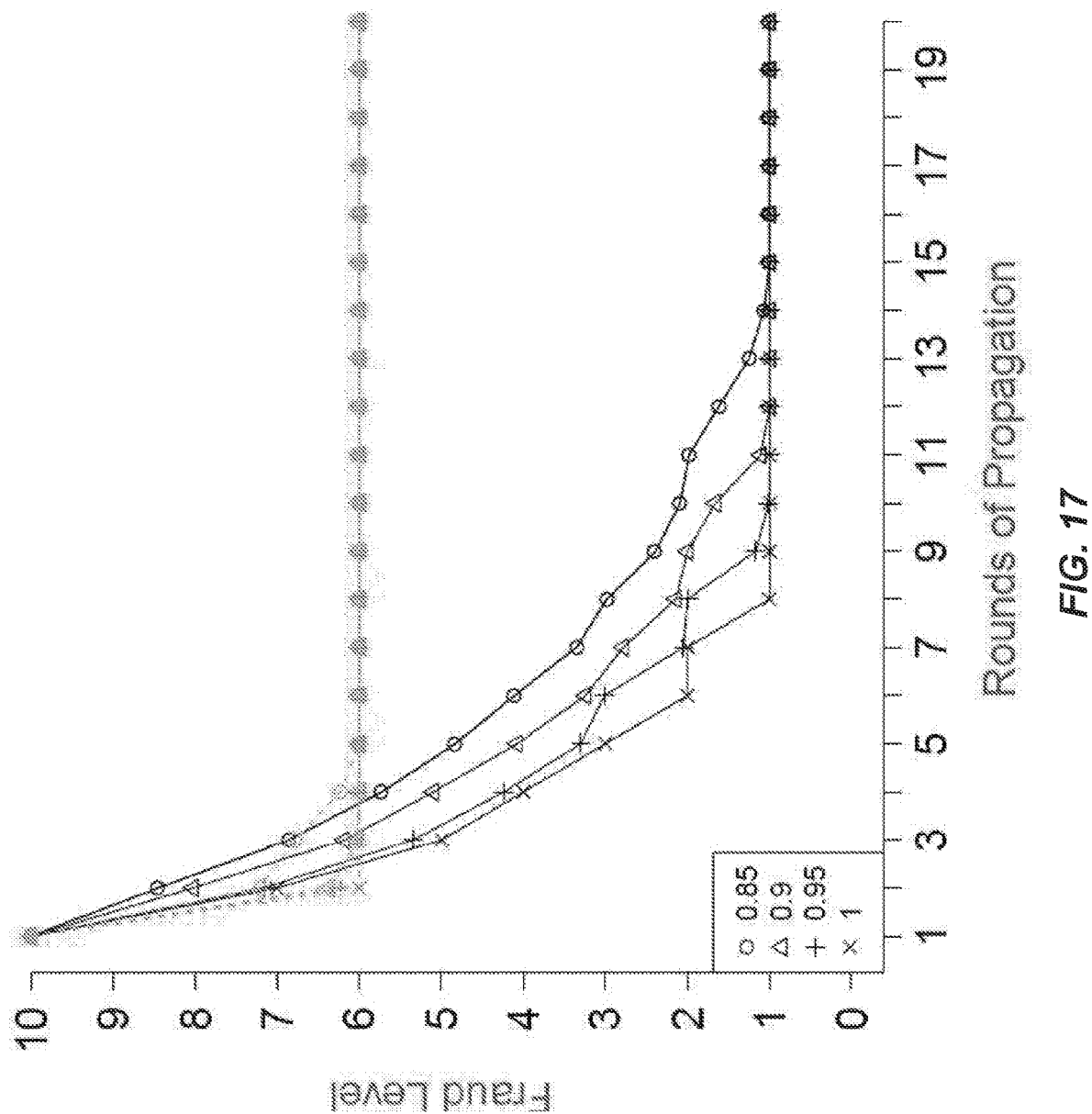
FIG. 17 shows a graph of the effect of trust propagation according to embodiments of the disclosure.

This point is depicted in FIG. 17 where there are only four whistle blowers and the rest of the nodes are blind to the malicious behavior of the initiator.

C. Performance Measurement

Table 3, below, gives examples of three IoT devices, a watch, a smart thermostat, and a home assistant device, and the resources of each of these devices. Each of these devices have at least 1 GHz CPU, Wi-Fi connection, and enough memory available to perform CoRA. Table 3 shows that not all smart-home devices are resource-limited.

For a single core, 1 GHz device, it takes about 124:8 ms to compute a threshold MAC token. This number is negligible compared to the 25 seconds delay of today's interactive 2FA system.

TABLE 3

(Example smart home devices and their resources)

| Device | CPU | Radio | Storage |
|---|---|---|---|
| Nest Thermostat | 1 GHz A8 | Wi-Fi/Zigbee | 2 Gb |
| Huawei Watch 2 | 1.2 GHz A7 | Wi-Fi/BT/LTE | 4 Gb |
| Google Home | 1.5 GHz A7 | Wi-Fi | 256 Mb |

Two operations, according to embodiments of the disclosure, at the time of authentication can include token share generation on witness devices and token share combination on the initiator. Assuming six registered devices, if three of the devices participate at assurance level 2, it can take about 32 ms to generate token shares for all levels, and about 7.5 ms to find the best level and combine the shares (see the table 4). This testing was performed on a smartphone with a 2.36 GHz CPU.

Contemporary IoT devices are sufficiently powerful to perform on par with a smartphone. For example, devices such as the Nest thermostat, the Huawei Watch 2, and Google Home all have 1+GHz CPUs and 0.2-4 GB of RAM. For a single core, 1 GHz device, in average it takes about 124.8 ms to compute a threshold MAC token. This number includes the communication and threshold MAC computation. This number is negligible compared to the 25 seconds delay of today's interactive 2FA system [33]. Table 4 shows the performance of threshold MAC operations, measured on a smartphone at assurance level 2 (average over ten experiments).

TABLE 4

(Performance of threshold MAC operations, measured on a smartphone at assurance level 2 over ten experiments)

| Operation | Mean (ms) | StdDev |
|---|---|---|
| Generate Shares | 32.10 | 1.37 |
| Combine Shares | 7.60 | 0.52 |

VIII. APPLICATIONS

This section discusses the advantages of having a multi-level and risk-aware authentication system according to embodiments of the disclosure for three specific applications: 1) registration with high assurance; 2) a payment system where a user is authorized to spend money based on the assurance level of an authentication token; and 3) a login mechanism where the user is given read or write permissions based on the token assurance level.

A. Registration vs. Authentication

One application of having multiple assurance levels is requiring higher security for more sensitive tasks versus allowing more usability for everyday tasks. Registration of a device is a one-time, but highly sensitive, task for which the highest assurance level and highest threshold is required.

B. CoRA and 3D Secure

Another application can include a user authenticating so that they can proceed with a payment transaction. Card-not-present situations account for 60%-70% of fraud in payments [28] (i.e., the failure to detect unauthorized transactions by the attacker). One remedy to online transaction fraud is to use 2FA and more specifically 3D Secure [8]. 3D Secure may not be seamless in its current version as it engages the user in the authentication to ensure the right user is present; in other words, it improves security at the cost of user dissatisfaction and potential purchase abandonment. Embodiments of the disclosure allow for a seamless MFA while maintaining a similar level of security.

Next, a specific use case for CoRA will be described. A user who has six registered smart devices can attempt to make an online payment. After the user enters their credentials (e.g., credit card information), one of the user devices (e.g., a laptop) can communicate with nearby user devices and asks for "witnesses." If a token of assurance level three is generated by the user devices, as described herein, the user would be given access to spend a payment capped by their credit line. A token at level two can grant a payment of up to $100. A token of level one can allow spending of up to 20.

C. CoRA Login for Sensitive Websites

As another example, embodiments of the disclosure can allow for user authentication to access a sensitive website, data, and/or location. For example, if the user is at home and has multiple user devices in proximity (e.g., in the house, in the room, etc.), a token of level three can be generated which can give the user full access to the sensitive website, for example, a bank account. If the user has two user devices in proximity, the user can be given access to pay their bills, and move money between their accounts at the same bank. For a token of level one, the user can be given access to see ten recent transactions, but not interact with the accounts. At any point in time, the user can be able to achieve full access by going through the interactive 2FA.

IX. CONCLUSION

Embodiments of the disclosure provide for a collaborative authentication mechanism by using threshold cryptography and anomaly detection. Embodiments allow for a distributed MFA scheme where an application layer can choose the balance for security and usability. An authentication token collaboratively generated by the user devices can be accompanied by an assurance level that can assist an authentication server with access control and granting the right level of privilege to the user. Embodiments of the disclosure have improved security by increasing the number of participating devices in MFA. Embodiments can maintain user privacy in the sense that user devices do not send any extra information to the authentication server except for the assurance level.

X. COMPUTER SYSTEM

Figure 18:
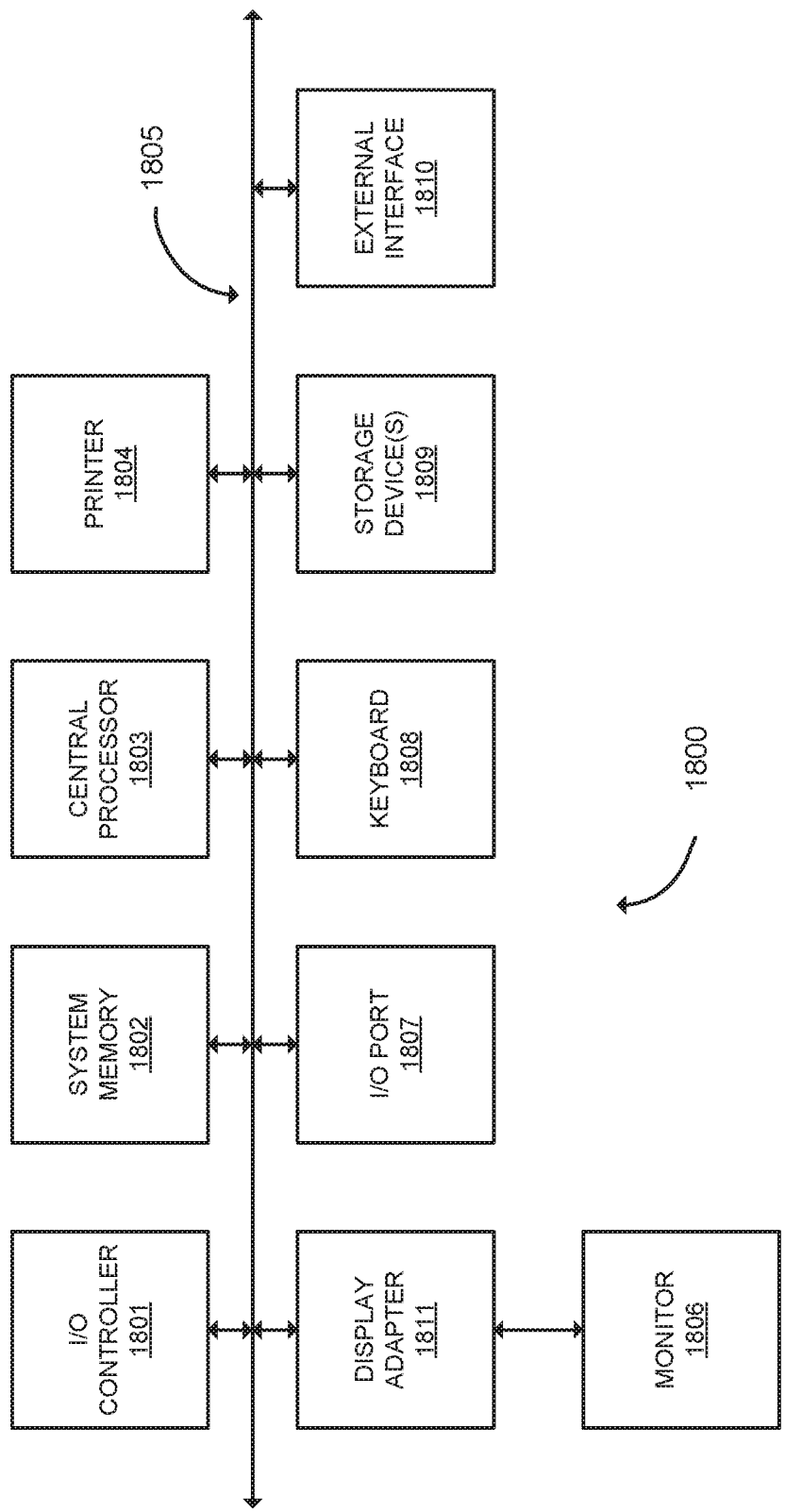
FIG. 18 shows a block diagram illustrating a computer system according to some embodiments.

Any of the computer systems mentioned herein may utilize any suitable number of subsystems. Examples of such subsystems are shown in FIG. 18 in computer apparatus 1800. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 18 are interconnected via a system bus 1805. Additional subsystems such as a printer 1804, keyboard 1808, storage device(s) 1809, monitor 1806, which is coupled to display adapter 1811, and others are shown. Peripherals and input/output (I/O) devices which couple to I/O controller 1801, can be connected to the computer system by any number of means known in the art such as input/output (I/O) port 1007 (e.g., USB, FireWire®). For example, I/O port 1807 or external interface 1810 (e.g., Ethernet, Wi-Fi, etc.) can be used to connect computer system 1800 to a wide area network such as the Internet, a mouse input device, or a scanner. The interconnection via system bus 1805 allows the central processor 1803 to communicate with each subsystem and to control the execution of instructions from system memory 1802 or the storage device(s) 1809 (e.g., a fixed disk, such as a hard drive or optical disk), as well as the exchange of information between subsystems. The system memory 1802 and/or the storage device(s) 1809 may embody a computer readable medium. Any of the data mentioned herein can be output from one component to another component and can be output to the user.

A computer system can include a plurality of the same components or subsystems, e.g., connected together by external interface 1810 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the described embodiments can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement the described embodiments using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including internet protocols. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects. The above description of exemplary embodiments has been presented for the purpose of illustration and description. It is not intended to be exhaustive or to limit embodiments to the precise form described, and many modifications and variations are possible in light of the teaching above. The embodiments were chosen and described in order to best explain the principles of embodiments and their practical applications to thereby enable others skilled in the art to best utilize various embodiments and various modifications to those embodiments as suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

XI. REFERENCES

1. Algorithms, key size and protocols report, h2020-ict-2014 project 645421, ecrypt csa, 2018
2. Barker, E., NIST special publication 800-57 part 1, revision 4, 2016
3. Boldyreva, A., Threshold signatures, multisignatures and blind signatures based on the gap-diffiehellman-group signature scheme, in *Proceedings of the 6th International Workshop on Theory and Practice in Public Key Cryptography: Public Key Cryptography* (London, UK, UK, 2003), PKC '03, Springer-Verlag, pp. 31-46
4. Bonneau, J. et al., The quest to replace passwords: A framework for comparative evaluation of web authentication schemes, in *Security and Privacy (SP)*, 2012 IEEE Symposium on (2012), IEEE, pp. 553-567
5. Corner, M. D., and Noble, B. D., Zero-interaction authentication, in *Proceedings of the 8th annual international conference on Mobile computing and networking* (2002), ACM, pp. 1-11
6. Czeskis, A. et al., Strengthening user authentication through opportunistic cryptographic identity assertions, in *Proceedings of the 2012 ACM conference on Computer and communications security* (2012), ACM, pp. 404-414
7. Doshi, R. et al., Machine learning DDoS detection for consumer internet of things devices, *arXiv preprint arXiv:* 1804.04159 (2018).
8. EMVCo. 3d secure v2.0, 2017.
9. Halevi, T. et al., Secure proximity detection for nfc devices based on ambient sensor data, in *European Symposium on Research in Computer Security* (2012), Springer, pp. 379-396
10. Kamvar, S. D. et al., The eigentrust algorithm for reputation management in p2p networks, in *Proceedings of the 12th international conference on World Wide Web* (2003), ACM, pp. 640-651
11. Karapanos, N. et al., Sound-Proof: Usable two-factor authentication based on ambient sound, in *USENIX Security Symposium* (2015), pp. 483-498
12. Marforio, C. et al., Smartphones as practical and secure location verification tokens for payments, in *NDSS* (2014)
13. Mustafa, M. A. et al., Frictionless authentication system: Security & privacy analysis and potential solutions. *arXiv preprint arXiv:* 1802.07231 (2018)
14. Naor, M. et al., Distributed pseudo-random functions and kdcs, in *Proceedings of the 17th International Conference on Theory and Application of Cryptographic Techniques* (Berlin, Heidelberg, 1999), EUROCRYPT'99, Springer-Verlag, pp. 327-346
15. Raza, S. et al., Real-time intrusion detection in the internet of things, *Ad hoc networks* 11, 8 (2013), 2661-2674
16. Shoup, V., Practical threshold signatures, in *Proceedings of the 19th International Conference on Theory and Application of Cryptographic Techniques* (Berlin, Heidelberg, 2000), EUROCRYPT'00, Springer-Verlag, pp. 207-220
17. Shrestha, B. et al., Drone to the rescue: Relay-resilient authentication using ambient multi-sensing, in *International Conference on Financial Cryptography and Data Security* (2014), Springer, pp. 349-364
18. Shrestha, B. et al., Contextual proximity detection in the face of context-manipulating adversaries, *arXiv preprint arXiv:* 1511.00905 (2015)
19. Shrestha, B. et al., The sounds of the phones: dangers of zero-effort second factor login based on ambient audio, in *Proceedings of the 2016 ACM SIGSAC Conference on Computer and Communications Security* (2016), ACM, pp. 908-919
20. Shrestha, P., and Saxena, No., Listening watch: Wearable two-factor authentication using speech signals resilient to near-far attacks, in *Proceedings of the 11th ACM Conference on Security & Privacy in Wireless and Mobile Networks* (2018), ACM, pp. 99-110
21. Truong, H. et al., Comparing and fusing different sensor modalities for relay attack resistance in zero-interaction authentication, in *Pervasive Computing and Communications (PerCom)*, 2014 IEEE International Conference on (2014), IEEE, pp. 163-171
22. Truong, H. et al., Using contextual co-presence to strengthen zero-interaction authentication: Design, integration and usability, *Pervasive and Mobile Computing* 16 (2015), 187-204
23. VISA, AND PYMNTS.COM. How will we pay—A week in the life of a connected consumer. Available online at www.pymnts.com/news/payments-innovation/2018/pymnts-visa-study-on-how-connected-devices-and-voice-change-how-and-who-consumers-pay/last accessed Nov. 1, 2018), October 2018
24. World Wide Web Consortium (W3C). Webauthn. www.w3.org/TR/webauthn 4
25. Shamir, A., How to share a secret. Communications of the ACM 22, 11 (1979), 612-613.
26. Al-Garadi, M. A., et al., A survey of machine and deep learning methods for internet of things (iot) security. arXiv preprint arXiv:1807.11023 (2018).
26. CERTICOM RESEARCH. Sec 2: Recommended Elliptic Curve Domain Parameters. Available online at www.secg.org/sec2-v2.pdf, 2010.
27. IETF. Compact representation of an elliptic curve point. Available online at www.tools.ietforg/id/draft-jivsov-ecc-compact-05.html, 2014.
28. Juniper Research., Online payment fraud whitepaper. Available online at www.experian.com/assets/decision-analytics/white-papers/juniper-research-online-payment-fraud-wp-2016.pdf, 2016.
29. Lee, S.-Y., et al., Profiot: Abnormal behavior profiling (abp) of iot devices based on a machine learning approach. In 2017 27th International Telecommunication Networks and Applications Conference (ITNAC) (2017), IEEE, pp. 1-6.

30. Maurer, U. Secure multi-party computation made simple. Discrete Applied Mathematics 154, 2 (2006), 370-381. Coding and Cryptography.
31. Nobakht, M., et al., A host-based intrusion detection and mitigation framework for smart home iot using openflow. In Availability, Reliability and Security (ARES), 2016 11th International Conference on (2016), IEEE, pp. 147-156.
32. Smart, N. P., Algorithms, Key Size and Protocols Report, H2020-ICT-2014 Project 645421, ECRYPT CSA. Available online at www.ecrypt.eu.org/csa/documents/D5.4-FinalAlgKeySizeProt.pdf, 2018.
33. Weir, C. S., et al., User perceptions of security, convenience and usability for ebanking authentication tokens. Computers & Security 28, 1-2 (2009), 47-62.
34. Zarpelao, B. B., et al., A survey of intrusion detection in internet of things. Journal of Network and Computer Applications 84 (2017), 25-37.

What is claimed is:

1. A method comprising:
    broadcasting, by an initiator device, a witness request to a plurality of authentication devices, wherein the plurality of authentication devices determine one or more assurance levels with respect to the initiator device, respectively, from a range of assurance levels and determine a token share corresponding to the one or more assurance levels, respectively;
    receiving, by the initiator device from the plurality of authentication devices, a plurality of witness responses comprising a set of token shares corresponding to an assurance level among the one or more assurance levels, wherein each of the token shares is a portion of an authentication token or determined using a key share that is a fraction of a cryptographic key;
    generating, by the initiator device, the authentication token, by using the token shares of the set; and
    transmitting, by the initiator device, the authentication token to an authentication server, wherein the authentication server verifies the authentication token.

2. The method of claim 1, wherein each of the plurality of witness responses further comprises at least one assurance level among the one or more assurance levels.

3. The method of claim 1, wherein the witness request specifies one or more requested assurance levels, and wherein the one or more requested assurance levels include the assurance level corresponding to the set of token shares.

4. The method of claim 1, wherein the set of token shares is associated with a first assurance level of the range of assurance levels, and wherein the method further comprises:
    determining a first amount of the yet of token shares of the set of token shares; and
    determining, by the initiator device, the first assurance level associated with the set of token shares that include at least a threshold amount of token shares by comparing the first amount to the threshold amount.

5. The method of claim 4, wherein the first amount of the set of token shares is determined by summing weights of the set of token shares, wherein a higher value for a weight indicates the token share is more secure.

6. The method of claim 4, further comprising:
    obtaining, by the initiator device, an initiator token share corresponding to the first assurance level and any other token share(s) when lower assurance levels exist.

7. The method of claim 4, wherein the token shares are included in a plurality of token shares corresponding to the one or more assurance levels, the first assurance level includes one or more first assurance levels respectively associated with one or more sets of token shares, and wherein the authentication token is one or more authentication tokens.

8. The method of claim 4 further comprising:
    transmitting, by the initiator device, the first assurance level to the authentication server.

9. The method of claim 1, further comprising:
    prior to broadcasting the witness request, receiving, by the initiator device, a challenge request from the authentication server.

10. The method of claim 9, wherein the authentication server generates the challenge request after receiving authentic credentials from a user device.

11. The method of claim 9, wherein the challenge request is received from the authentication server via a user device.

12. The method of claim 1, wherein generating the authentication token further comprises:
    removing, by the initiator device, duplicate token shares from the set of token shares; and
    XORing, by the initiator device, remaining token shares from the set of token shares to determine the authentication token.

13. The method of claim 1, further comprising:
    prior to broadcasting the witness request, determining, by the initiator device, the witness request based on at least one of user input, an internal timer, and a detection of an anomaly.

14. A method comprising:
    receiving, by an authentication device from an initiator device, a witness request;
    determining, by the authentication device, a first assurance level with respect to the initiator device based on a trust score, the first assurance level determined from a range of assurance levels;
    obtaining, by the authentication device, a token share corresponding to the first assurance level, wherein the token share is one of a plurality of token shares associated with a plurality of authentication devices, respectively, wherein each of the plurality of token shares is a portion of an authentication token or determined using a key share that is a fraction of a cryptographic key, and wherein the plurality of token shares results are used in generation of the authentication token; and
    transmitting, by the authentication device to the initiator device, the token share for the first assurance level.

15. The method of claim 14, wherein obtaining the token share further comprises:
    obtaining, by the authentication device, other token share(s) corresponding to lower assurance levels when assurance levels lower than the first assurance level exist.

16. The method of claim 15, wherein transmitting the token share further comprises:
    transmitting, by the authentication device, the other token share(s) for each of the lower assurance level.

17. The method of claim 16, wherein obtaining the token share corresponding to the first assurance level and the other token share(s) corresponding to the lower assurance levels further comprises:
    retrieving, by the authentication device, a first key share corresponding to the first assurance level and mother key share(s) corresponding to the other token share(s);
    deriving, by the authentication device, the token share corresponding to the first assurance level from the first key share; and deriving, by the authentication device, the other token share(s) corresponding to the lower assurance levels from the other key share(s).

18. The method of claim 14, wherein the initiator device determines a highest assurance level associated with a threshold amount of token shares received from the plurality of authentication devices that include the authentication device and are proximate the initiator device.

19. The method of claim 14 further comprising:
determining, by the authentication device, the trust score associated with the initiator device based on at least network data,
wherein the network data includes at least one from among transmission rates, data reception rates, average size of data packets, source addresses, domain name system information, IP addresses, hostnames, signal strength data, and Wi-Fi connection data, and
wherein the trust score is determined based on at least one at least one from among a difference between historically typical transmission rates and the transmission rates, a difference between historically typical data reception rates and the data reception rates, and a difference between historically typical average size of data packets and the average size of data packets.

20. The method of claim 19, wherein the trust score is a local trust score, and wherein determining the trust score further comprises:
receiving, by the authentication device, one or more remote trust scores from one or more additional authentication devices; and
determining, by the authentication device, the trust score using a weighted average of the local trust score and the one or more remote trust scores.

* * * * *

UNITED STATES PATENT AND TRADEMARK OFFICE
CERTIFICATE OF CORRECTION

PATENT NO. : 11,895,113 B2
APPLICATION NO. : 17/291090
DATED : February 6, 2024
INVENTOR(S) : Mastooreh Salajegheh et al.

It is certified that error appears in the above-identified patent and that said Letters Patent is hereby corrected as shown below:

In the Specification

In Claim 4, Column 47, Line 50, please remove "determining a first amount of the yet of token shares" and insert -- determining a first amount of the token shares --

In Claim 16, Column 48, Line 57, please remove "share(s) for each of the lower assurance level." and insert -- share(s) for each of the lower assurance levels. --

In Claim 17, Column 48, Line 63, please remove "corresponding to the first assurance level and mother" and insert -- corresponding to the first assurance level and other --

Signed and Sealed this
Twenty-third Day of April, 2024

Katherine Kelly Vidal
*Director of the United States Patent and Trademark Office*